US012766678B2

(12) United States Patent
Schuller et al.

(10) Patent No.: US 12,766,678 B2
(45) Date of Patent: Oct. 20, 2026

(54) METHOD FOR OPERATING A HAND-HELD POWER TOOL

(71) Applicant: Robert Bosch GmbH, Stuttgart (DE)

(72) Inventors: Marcus Schuller, Dettenhausen (DE); Tobias Herr, Stuttgart (DE); Simon Erbele, Nufringen (DE); Wolfgang Herberger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 350 days.

(21) Appl. No.: 18/496,993

(22) Filed: Oct. 30, 2023

(65) Prior Publication Data

US 2024/0149411 A1 May 9, 2024

(30) Foreign Application Priority Data

Nov. 8, 2022 (DE) ..................... 10 2022 210 619.9

(51) Int. Cl.
*B25B 21/02* (2006.01)
*B25B 23/14* (2006.01)
*B25B 23/147* (2006.01)

(52) U.S. Cl.
CPC .......... *B25B 21/02* (2013.01); *B25B 23/1405* (2013.01); *B25B 23/1475* (2013.01)

(58) Field of Classification Search
CPC . B25B 21/02; B25B 23/1405; B25B 23/1475; B25B 21/00; B25B 21/026; B25B 23/0064; B25B 23/141; B25B 31/00; B25B 21/008
See application file for complete search history.

(56) References Cited

U.S. PATENT DOCUMENTS

| | | | | |
|---|---|---|---|---|
| 2019/0047133 | A1* | 2/2019 | Beckert | B25B 23/1475 |
| 2020/0361064 | A1* | 11/2020 | Gaul | B25B 21/02 |
| 2021/0060755 | A1* | 3/2021 | Kawai | B25F 5/00 |

FOREIGN PATENT DOCUMENTS

| | | | |
|---|---|---|---|
| DE | 20 2017 003 590 | U1 | 10/2017 |
| DE | 102019204071 | A1 | 10/2020 |
| DE | 10 2019 215 417 | A1 | 4/2021 |
| DE | 10 2020 124 812 | A1 | 4/2021 |
| DE | 102020211889 | A1 | 3/2022 |
| DE | 102020215988 | A1 | 6/2022 |
| EP | 3 228 423 | A1 | 10/2017 |
| EP | 3 381 615 | A1 | 3/2018 |

* cited by examiner

*Primary Examiner* — Veronica Martin
(74) *Attorney, Agent, or Firm* — Maginot, Moore & Beck LLP

(57) ABSTRACT

A method for operating a hand-held power tool, in particular a rotary impact wrench, the hand-held power tool comprising an electric motor, the method including selecting an application class depending on at least one hardness and/or strength property of a substrate in which a screwdriving operation is to be carried out, and selecting an operation mode from an operation mode group comprising a first operation mode and a second operation mode, based at least in part on the application class. The first operation mode has a first maximum torque level of the electric motor per application class and the second operation mode has a second maximum torque level per application class. Furthermore, a hand-held power tool, in particular an impact wrench, having an electric motor and a control unit is disclosed, the control unit being designed for carrying out a method according to the disclosure.

17 Claims, 16 Drawing Sheets f(x)
200

$\chi_1(x)$
203 (a)
203
$SP_2$
t2

$\chi_2(x)$
204 (a)
204
$SP_3$
t3

METHOD FOR OPERATING A HAND-HELD POWER TOOL

This application claims priority under 35 U.S.C. § 119 to application no. DE 10 2022 210 619.9, 08.11.2022, filed on Aug. 11, 2022 in Germany, the disclosure of which is incorporated herein by reference in its entirety.

The disclosure relates to a method for operating a hand-held power tool, and to a hand-held power tool set up for carrying out the method. More particularly, the present disclosure relates to a method of screwing in or unscrewing a threaded fastener using a hand-held power tool, preferably an impact wrench.

BACKGROUND

From the prior art, see for example EP 3 381 615 A1, rotary impact wrenches for tightening screw elements, such as threaded nuts and screws, are known. For example, a rotary impact wrench of this type comprises a structure in which an impact force in a rotational direction is transferred to a screw element by a rotational impact force of a hammer. The rotary impact wrench, which has this construction, comprises a motor, a hammer driven by the motor, an anvil that is struck by the hammer, and a tool. In the rotary impact wrench, the motor installed in a housing is driven, wherein the hammer is electrically driven by the motor, the anvil is struck by the rotating hammer in turn, and an impact force is delivered to the tool, wherein two different operating states, namely "no impact operation" and "impact operation," can be distinguished.

From DE 20 2017 0035 90 an electrically driven tool with an impact mechanism is also known, wherein the hammer is driven by the motor.

In the field of rotary impact wrenches, attempts are being made to achieve an ever greater output torque in those devices that are classically operated with a hexagonal bit, in order to achieve rapid work progress with a maximum torque in the most frequently used working case, the so-called "soft" screwdriving in wood and especially softwood. The soft screw base offers little resistance to the high torques involved, and the reaction forces acting on the tool and the bit are correspondingly low and do not pose a problem with regard to the strength of the materials used for the bit and hand-held power tool.

However, if a "hard" screwdriving operation is carried out in hardwood, metal or concrete, for example, with such an optimized device, the high resistance in the screwdriving base and the direct reaction on the bit will very quickly cause damage to the bit, which in the worst case can even lead to the bit breaking off. This is disadvantageous because the bit has to be replaced and the broken off remains often get stuck in the device or in the screw head, respectively, which makes awkward and sometimes lengthy replacement work necessary. From the point of view of work safety, too, a breaking bit and the resulting unforeseen jolt as well as the sudden loss of contact between the hand-held power tool and the fastener represent an event to be avoided.

A similar problem can also occur with devices with a square tool holder if they are used with attachments that enable Torx screwdriving operation, for example. Here, too, the attachment breaks off very quickly in the hard screwdriving if the torque load exceeds the capacity of the attachment.

It is also known that the achievable torque of an impact wrench depends on the number of revolutions or impacts and the impact duration, and that limiting one or both of these parameters contributes significantly to reducing the load on the device and the insert tool.

When using rotary impact wrenches, a high level of concentration on work progress is required on the user's side anyway in order to ensure that certain machine characteristics, for example the starting or stopping of the impact mechanism are reacted to accordingly, for example in order to stop the electric motor and/or to carry out a change in the speed via the hand switch. Since the user often cannot react quickly enough or appropriately to a work progress, the aforementioned problem of the bit breaking off can occur when using rotary impact wrenches during screw-in operations.

It is therefore generally desired to further automate the operation and to take the burden off of the user with correspondingly machine-triggered routines of the device and thus to reliably achieve reproducible screw-in and screw-out operations of high quality.

SUMMARY

In principle, the problem of avoiding overloading of tools or tool attachments and automating operation as far as possible also exists with other hand-held power tools such as impact drills, so that the disclosure is not limited to rotary impact wrenches. However, the disclosure will be explained in more detail below using the example of a rotary impact wrench.

The problem addressed by the disclosure is to provide an improved method for operating a hand-held power tool compared to the prior art, which at least partly overcomes the aforementioned disadvantages, or at least is an alternative to the prior art. A further problem is to specify a corresponding hand-held power tool.

Another object of the disclosure is to provide the user with a hand-held power tool that allows him to have full speed, full torque, and thus full power available in the soft screwdriving, while allowing him to work with the same tool in the hard screwdriving at reduced speed and torque to avoid breaking the bits.

This problem is solved by means of the respective subject matter of the disclosure. Advantageous configurations of the disclosure are the subject matter of the disclosure.

According to the disclosure, a method for operating a hand-held power tool is disclosed, wherein the hand-held power tool comprises an electric motor. This method comprises the following steps:

a. S1 selecting an application class depending on at least one hardness and/or strength property of a substrate in which a screwdriving operation is to be carried out;
b. S2 selecting an operation mode from an operation mode group comprising a first operation mode and a second operation mode, based at least in part on the application class;

wherein the first operation mode has a first maximum torque level delivered by the hand-held power tool per application class and the second operation mode has a second maximum torque level per application class.

The method according to the disclosure effectively supports a user of the hand-held power tool in achieving reproducible high-quality application results, while ensuring that work is always performed at a torque level appropriate to the respective application class. In particular, damage to a tool bit due to excessive torque can be prevented.

In this disclosure, an application class is broadly understood to mean the use of the hand-held power tool for a particular purpose. In a rotary impact wrench, for example, the application class may be determined by a property of the material forming the substrate in which the screwdriving operation is to be carried out, or in other words, the screwdriving substrate. In this case, for example, the application classes "hard screwdriving" and "soft screwdriving" can be defined, depending on whether the screwing substrate is categorized as "hard" or "soft".

A "hard" screw substrate would be hardwood, metal, or concrete, for example, while a "soft" screw substrate would be softwood or certain plastics, for example. The determining material property for differentiating between the application classes "hard" and "soft" screwdriving would therefore be, for example, the surface hardness of the screwing substrate.

Other parameters that could define different application classes could be, for example, the support of the screw base (loose or clamped), a thickness of the screw base, and/or an assembly situation (such as overhead work).

In the context of the present disclosure, an operation mode is to be understood as a presetting of one or more parameters which determine or influence the operation of the hand-held power tool, and in particular the level of torque which the hand-held power tool delivers. Such parameters can be, for example, a maximum speed of the electric motor and/or a maximum impact duration during which the anvil delivers impacts to a screw head.

In embodiments of the disclosure, for each application class, the respective first maximum torque level is higher than the corresponding second maximum torque level. Accordingly, in parts of this disclosure, the second operation mode is also referred to as the "gentle mode" because the lower torque level relative to the first operation mode is accompanied by a reduced load on the components involved in the screw-in process on the machine, tool, and fastener sides.

Depending on the application class, the respective second maximum torque level can be characterized by a lower speed of the electric motor and/or a lower impact duration compared to the corresponding first torque level.

Advantageously, in step S2 the first operation mode can be selected if the application class soft screwdriving is present and the second operation mode can be selected if the application class hard screwdriving is present.

In step S1, selecting the application class may be performed by a user, optionally via application software ("app") installed on an external device, such as a smartphone, tablet, or computer, and/or a user interface on the hand-held power tool (100) ("human-machine interface", "HMI").

Similarly, selecting the operation mode in step S2 may be performed by a user, optionally via application software ("app") and/or a user interface on the hand-held power tool (100) ("human-machine interface", "HMI").

Alternatively, in step S2, the selection of the operation mode can be at least partially automatic. In this context, "partially automatic" means that an operation mode is suggested to a user on the basis of a machine evaluation, which will be detailed further on, and which the user can then confirm or reject. In the case of automatic selection, the user is not asked for such confirmation when specifying the operation mode.

Accordingly, in step S1, the selection of the application class can be at least partially automatic. It applies here mutatis mutandis that a partially automatic selection means that the user can agree to or reject a machine-side suggestion. In case of automatic selection, the user is not asked for such confirmation when defining the application class.

In step S1, selecting the application class may comprise the following steps:

S1.1 ascertaining a signal of an operating variable of the electric motor;

S1.5 selecting the application class based at least in part on the signal of the operating variable.

This takes advantage of the fact that certain characteristics of a screw support, such as its surface hardness, have an influence on certain operating variables of the electric motor, such as its speed, which in turn is reflected in the corresponding signals of these operating variables.

To evaluate the signals of the operating variable, the method may comprise the following method steps:

S1.2 providing at least one model signal waveform, wherein the model signal waveform is assignable to one of the application classes;

S1.3 comparing the signal of the operating variable with the model signal waveform and ascertaining a match score from the comparison;

S1.4 detection of the application class at least in part based on the match score ascertained in method step S1.3.

Advantageously, several model signal waveforms of different application classes are predefined in method step S1.2, in particular defined at the factory. In principle, it is conceivable that the model signal waveforms are deposited or stored on the device, alternatively and/or additionally provided to the hand-held power tool, in particular from an external data device.

Preferably, the model signal waveform is a vibration course, such as a vibration course around a mean, in particular a substantially trigonometric vibration course.

In method step S1.3, the signal of the operating variable can be compared with the model signal waveforms by means of a comparison method to determine whether at least one predetermined threshold value of the match is met.

Preferably, the comparison method comprises in step 1.3 at least one frequency-based comparison method and/or one comparative comparison method.

Here, at least in part, the frequency-based comparison method, in particular bandpass filtering and/or frequency analysis, can be used to decide whether a particular application class, hereinafter also referred to as the "application class to be detected", has been identified in the signal of the operating variable.

In one embodiment, the frequency-based comparison method comprises at least band-pass filtering and/or frequency analysis, wherein the specified threshold value is at least 90%, in particular 95%, more particularly 98%, of a specified limit value.

For example, in band-pass filtering, the received signal of the operating variable is filtered via a band-pass whose penetration range agrees with the model signal waveform. A corresponding amplitude in the resulting signal is to be expected if the relevant application class to be detected is present. The specified threshold value of the band-pass filtering can therefore be at least 90%, in particular 95%, more particularly 98%, of the corresponding amplitude in the application class to be detected. The specified limit value can be the corresponding amplitude in the resulting signal of an ideal application class to be detected.

By the known frequency-based comparison method of frequency analysis, the predetermined model signal waveform, for example a frequency spectrum of the application class to be detected, can be searched in the received signals of the operating variable. A corresponding amplitude of the application class to be detected is to be expected in the received signals of the operating variable. The specified threshold value of the frequency analysis can be at least 90%, in particular 95%, more particularly 98%, of the corresponding amplitude in the application class to be detected. The specified limit value can be the corresponding amplitude in the received signals of an application class to be detected. An appropriate segmentation of the received signal of the operating variable can be necessary.

In one embodiment, the comparison method comprises at least one parameter estimate and/or a cross-correlation, wherein the specified threshold value is at least 40% of a match of the signal of the operating variable to the model signal waveform.

The measured signal of the operating variable can be compared to the model signal waveform by means of the comparative comparison method. The measured signal of the operating variable is ascertained such that it has substantially the same finite signal length as that of the model signal waveform. The comparison of the model signal waveform to the measured signal of the operating variable can be output as a signal of a finite length, in particular discrete or continuous. Depending on a degree of match or a deviation of the comparison, a result can be output as to whether the application class to be detected is present. If the measured signal of the operating variable agrees at least to 40% with the model signal waveform, the application class to be detected can be present. In addition, it is conceivable that the comparison method can output a degree of comparison in relation to one another by means of the comparison of the measured signal of the operating variable with the model signal waveform as the result of the comparison. In this case, the comparison of at least 60% to one another can be a criterion for the existence of the application class to be detected. It is to be assumed that the lower limit for the match is 40% and the upper limit for the match is 90%.

In the parameter estimate, a comparison between the predetermined model signal waveform and the signal of the operating variable can be easily made. For this purpose, estimated parameters of the model signal waveform can be identified in order to adjust the model signal waveform to the measured signal of the operating variables. By means of a comparison between the estimated parameters of the predetermined model signal waveform and a limit value, a result for the existence of the application class to be detected can be ascertained. Then, a further assessment of the result of the comparison can be made as to whether the specified threshold value has been achieved. This rating can be either a quality determination of the estimated parameters or the match between the set model signal waveform and the detected signal of the operating variable.

In a further embodiment, method step S1.3 comprises a step S1.3a of a quality determination of the identification of the model signal waveform in the signal of the operating variable, wherein, in method step S1.4, the detection of the application class is carried out at least in part on the basis of the quality determination. As a measure of quality determination, an adjustment quality of the estimated parameters can be ascertained.

In method step S1.4, a decision can be made as to whether the application class to be detected in the signal of the operating variable has been identified, at least partially by means of the quality determination, in particular the measure of quality.

Additionally or alternatively to determining the quality, method step S1.3a can comprise a comparison determination of the identification of the model signal waveform and the signal of the operating variable. For example, the comparison of the estimated parameters of the model signal waveform to the measured signal of the operating variable can be 70%, in particular 60%, more particularly 50%. In method step S1.4, the decision as to whether the application class to be detected is present is made at least in part on the basis of the comparison determination. The decision on the presence of the application class to be detected can be made for the specified threshold value of at least 40% match of the measured signal of the operating variable and the model signal waveform.

In a cross-correlation, a comparison can be made between the predetermined model signal waveform and the measured signal of the operating variable. In the cross-correlation, the previously determined model signal waveform is correlated with the measured signal of the operating variable. When the model signal waveform is correlated with the measured signal of the operating variable, a measure of the match of the two signals can be ascertained. For example, the degree of match can be 40%, in particular 50%, more particularly 60%.

In method step S1.4 of the method according to the disclosure, the detection of the application class can occur at least partly on the basis of the cross-correlation of the model signal waveform to the measured signal of the operating variable. The detection can be carried out at least in part on the basis of the specified threshold value of at least 40% match of the measured signal of the operating variable and the model signal waveform.

In one embodiment, the threshold value of the match can be predefined by a user of the hand-held power tool or by way of factory pre-settings.

This essentially dispenses with, in particular, additional sensor units for recording the mold-internal measured variables, such as an acceleration sensor unit.

To make the method even more flexible, it may comprise the following method step:

SM performing a machine learning phase using at least two or more example applications, where the example applications cover different application classes;

wherein the selection of the application class in step S1.5 is based at least in part on application classes learned in the machine learning phase.

In this way, it is possible, for example, for a user to improve the selection of the application class by selecting corresponding example applications and/or to make further, user-specific application classes accessible to a selection.

Thus, the method step SM may further comprise storing and classifying signals of the operating variable associated with the example applications into at least one or more application classes, and generating model signal waveforms associated with the application classes from the signals of the operating variable.

Here, the example applications can be executed by the user of the hand-held power tool and/or read in from a database.

The operating variable can be the speed of the electric motor or an operating variable correlated with the speed. For example, the fixed gear ratio of the electric motor to the impact mechanism results in a direct dependence of the motor speed on the frequency of the impact. A further conceivable operating variable correlating to the speed is the motor current. As an operating variable of the electric motor, a motor voltage, a Hall signal of the motor, a battery current, or a battery voltage are also conceivable, wherein an acceleration of the electric motor, an acceleration of a tool holder, or a sound signal of an impact mechanism of the hand-held power tool is also conceivable as the operating variable.

The approach for detecting the application class via operating variables in the in-tool measured variables, for example the speed of the electric motor, proves to be particularly advantageous, because with this method the application class is carried out particularly reliably and largely independently of the general operating state of the tool or the application case.

In method step S1.1, the signal of the operating variable can be received as a time course of measured values of the operating variable, or as measured values of the operating variable as a variable of the electric motor correlating to the time course.

Variables of the electric motor correlating with the time course can be, for example, an acceleration, a jerk, especially of higher order, a power, an energy, a rotation angle of the electric motor, a rotation angle of the tool holder, or a frequency.

In the last-mentioned embodiment, it can be ensured that a consistent periodicity of the signal to be investigated results, regardless of the motor speed.

If the signal of the operating variable is received in method step S1.1 as a time course of measured values of the operating variable, then, in a method step S1.1a following the method step S1.1, there is, on the basis of a rigid gear ratio of the transmission, a transformation of the time course of the measured values of the operating variable into a course of the measured values of the operating variable as a variable of the electric motor correlated with the time course. Thus, the same advantages result as in the direct receipt of the signal of the operating variable via the time.

The signal of the operating variable is to be considered a temporal sequence of measured values here. Alternatively and/or additionally, the signal of the operating variable can also be a frequency spectrum. Alternatively and/or additionally, the signal of the operating variable can also be reworked, for example smoothed, filtered, fitted, and the like.

In a further embodiment, the signal of the operating variable is stored in a memory, preferably a ring memory, in particular of the hand-held power tool, as a sequence of measured values.

A further subject matter of the disclosure is a hand-held power tool having an electric motor, a measured value transducer of an operating variable of the electric motor, and a control unit, wherein the hand-held power tool is advantageously an impact screwdriver, in particular a rotary impact wrench, and the hand-held power tool is configured so as to carry out the method described above.

The electric motor of the hand-held power tool sets an input spindle into rotation, and an output spindle is connected to the tool holder. An anvil is rotationally connected to the output spindle, and a hammer is connected to the input spindle in such a way that, as a result of the rotational movement of the input spindle, it carries out an intermittent movement in the axial direction of the input spindle as well as an intermittent rotational movement about the input spindle, wherein the hammer thus intermittently impacts the anvil and thus exerts an impact and rotational impulse on the anvil and thus on the output spindle. A first sensor transmits a first signal to the control unit, for example to ascertain a motor rotary angle. Furthermore, a second sensor can transmit a second signal to the control unit in order to ascertain a motor speed.

Advantageously, the hand-held power tool has a memory unit in which various values can be stored.

In a further embodiment, the hand-held power tool is a battery-operated hand-held power tool, in particular a battery-operated rotary impact wrench. In this way, a flexible and off-grid use of the hand-held power tool is ensured.

Advantageously, the hand-held power tool is an impact wrench, in particular a rotary impact wrench.

For example, the identification of impacts of the impact mechanism of the hand-held power tool, in particular the impact vibration periods of the electric motor, can be accomplished by using a fast-fitting algorithm in order to enable an evaluation of impact detection within fewer than 100 ms, particularly fewer than 60 ms, very particularly less than 40 ms.

With the present disclosure, it is possible to omit as far as possible more complex methods of signal processing such as, for example, filters, signal loopbacks, system models (static as well as adaptive), and signal tracking.

Moreover, these methods allow for even faster identification of impact operation and/or application class, which can be used in order to induce an even faster reaction of the tool. This applies in particular to the number of past impacts after the impact mechanism has been started until identification and even in special operating situations, such as the start-up phase of the drive motor. Furthermore, the functioning of the algorithm is also independent of other influencing variables such as target speed and battery charge state.

In principle, no additional sensor technology (e.g., accelerometer) is necessary, nevertheless these evaluation methods can also be applied to signals of further sensor technology. Furthermore, in other motor concepts, which do not require speed detection, for example, this method can also be used with other signals.

In a preferred embodiment, the hand-held power tool is a cordless screwdriver, a drill, an impact drill, or a drill hammer, wherein a drill, a drill crown, or various bit attachments can be used as the tool. The hand-held power tool according to the disclosure is in particular configured as an impact wrench, wherein a higher peak torque for screwing in or unscrewing a screw or a screw nut is generated by the impulsive release of the motor energy. In this context, the transmission of electrical energy is to be understood in particular to mean that the hand-held power tool transmits energy to the body via a battery and/or via a power cable connection.

In addition, depending on the selected embodiment, the screwdriver can be flexible in the direction of rotation. In this way, the proposed method can be used in order to both screw-in and unscrew a screw and a screw nut, respectively.

In the context of the present disclosure, "ascertaining" is meant to include in particular measuring or receiving, wherein "receiving" is understood in the sense of measuring and storing, and "ascertaining" also includes possible signal processing of a measured signal.

Furthermore, "deciding" should also be understood as recognizing or detecting, wherein a clear allocation is to be achieved. "Identifying" means a detection of a partial match with a pattern, which can be enabled, for example, by a fitting of a signal to the pattern, a Fourier analysis, or the like. The "partial match" is to be understood such that the fitting has an error that is less than a specified threshold value, in particular less than 30%, quite in particular less than 20%.

Further features, possible applications, and advantages of the disclosure emerge from the following description of the exemplary embodiment of the disclosure, which is shown in the drawing. It should be noted that the features described or depicted in the figures themselves or in any combination thereof describe the subject matter of the disclosure irrespective of their summary in the disclosure or their reverse relationship, as well as irrespective of their formulation or illustration in the specification or drawing and have only a descriptive character and are not intended to restrict the disclosure in any way.

BRIEF DESCRIPTION OF THE DRAWINGS

The disclosure is explained in further detail in the following with reference to preferred exemplary embodiments. The drawings are schematic and show:

FIG. 9(*b*) an amplitude function of a first frequency contained in the signal of FIG. 10(*a*).

FIG. 9(*c*) an amplitude function of a second frequency contained in the signal of FIG. 10(*a*).

DETAILED DESCRIPTION

Figure 1:
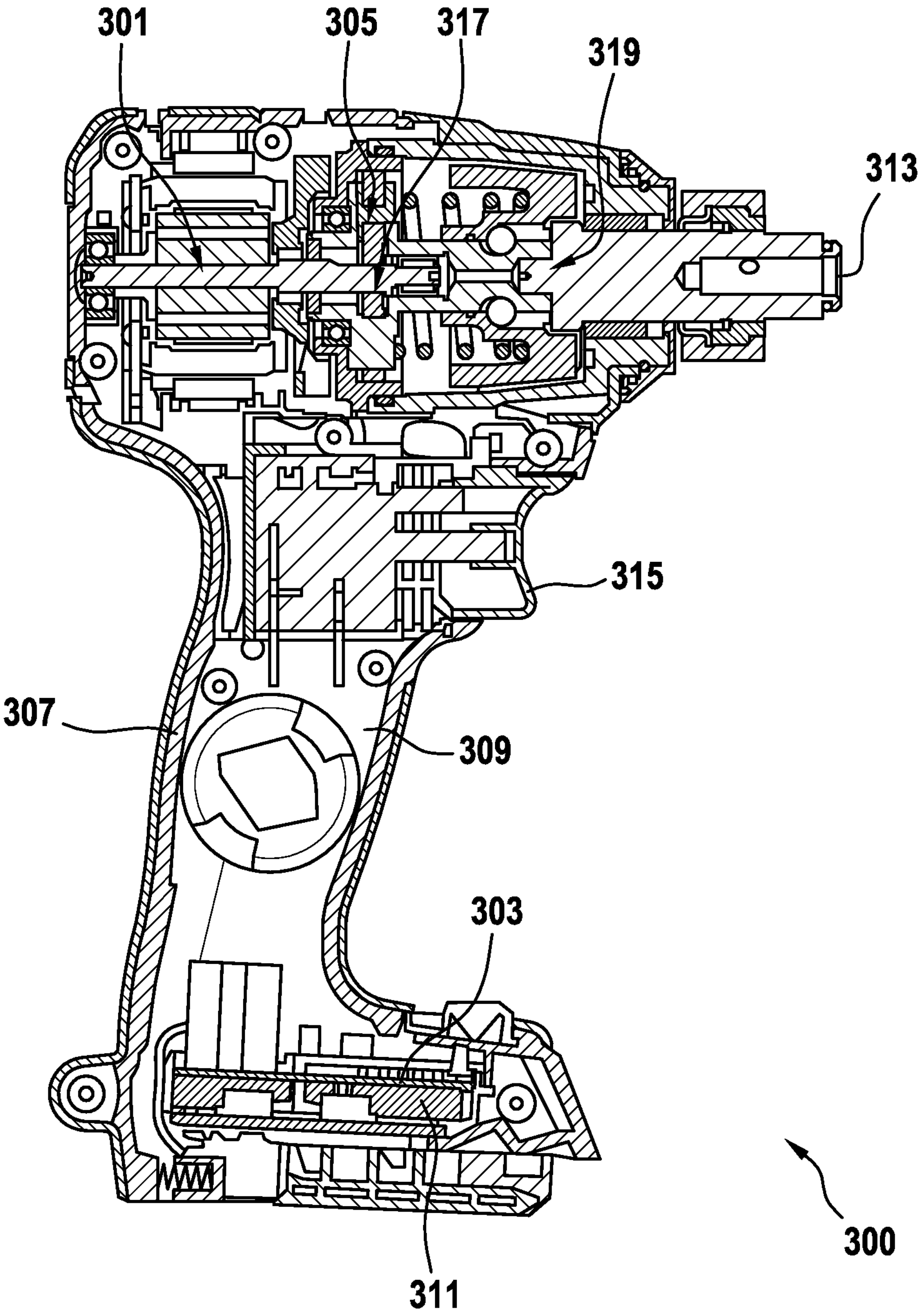
FIG. 1 a schematic illustration of a hand-held power tool.

FIG. 1 shows a hand-held power tool 100 according to the disclosure having a housing 105 with a handle 115. According to the embodiment shown, the hand-held power tool 100 is mechanically and electrically connectable to a battery pack 190 for off-grid power supply. In FIG. 1, the hand-held power tool 100 is configured by way of example as a battery-operated rotary impact wrench. It is noted, however, that the present disclosure is not limited to battery-operated rotary impact wrenches, but in principle can find application in hand-held power tools 100 where it is necessary to detect a work progress, such as impact drills.

A powered electric motor 180 and a transmission 170 from the battery pack 190 are arranged within the housing 105. The electric motor 180 is connected to an input spindle via the transmission 170. Furthermore, a control unit 370 is arranged within the housing 105 in the region of the battery pack 190, which influences the electric motor 180 and the transmission 170 by means of, for example, a set motor speed n, a selected rotational pulse, a desired transmission gear x, or the like.

For example, the electric motor 180 is actuatable, i.e., switchable, via a hand switch 195, and can be any type of motor, for example, an electronically commutated motor or a DC motor. Generally, the electric motor 180 is electronically controllable or adjustable such that both a reversing operation and specifications regarding the desired motor speed n and the desired rotational pulse can be implemented. The functionality and construction of a suitable electric motor are sufficiently known from the prior art, so that a detailed description is omitted here for the purpose of shortening the description.

A tool holder 140 is rotatably supported in the housing 105 via an input spindle and an output spindle. The tool holder 140 serves to receive a tool and can be directly formed on the output spindle and connected thereto in a cap-like manner.

The control unit 370 is in communication with a power source and is configured so as to electronically controllably or adjustably drive the electric motor 180 using various current signals. The various current signals provide for different rotational pulses of the electric motor 180, wherein the current signals are directed to the electric motor 180 via a control line. For example, the power source can be configured as a battery or, as in the illustrated exemplary embodiment, as a battery pack 190 or as a mains connection.

Furthermore, controls not shown in detail can be provided in order to adjust various modes of operation and/or the direction of rotation of the electric motor 180.

In accordance with one aspect of the disclosure, there is provided a method of operating the hand-held power tool 100 by means of which an overload of certain components or extensions of the hand-held power tool 100, for example an overload of a tool bit received by the tool holder 140, can be prevented.

The basic idea is to execute, in a step S1, an application class depending on at least one hardness and/or strength property of a substrate or a screw support in which a screwdriving operation is to be performed, and to select, in a step S2, an operation mode from an operation mode group comprising a first operation mode and a second operation mode, at least partly based on the application class. Here, the first operation mode has a first torque level output by the hand-held power tool 100 per application class and the second operation mode has a second maximum torque level per application class.

This makes it possible to work with optimized maximum torque depending on the application selected by the application class and thus prevent overloading of, for example, the tool bit or other sensitive components of the hand-held power tool 100. The operation mode which has a lower torque level per application class compared to the respective other operation mode is therefore also referred to as “gentle mode” in the following.

For example, as described above, the application class may be determined by a property of the material forming the screwing substrate, and in embodiments of the disclosure, a “hard screwdriving” and “soft screwdriving” are defined depending on whether the screwing substrate is “hard” or “soft”.

For the purpose of the present disclosure, a “hard” screw substrate is considered to be, for example, hardwood, metal, or concrete, while examples of a “soft” screw substrate comprise softwood or certain plastics.

Figure 2:
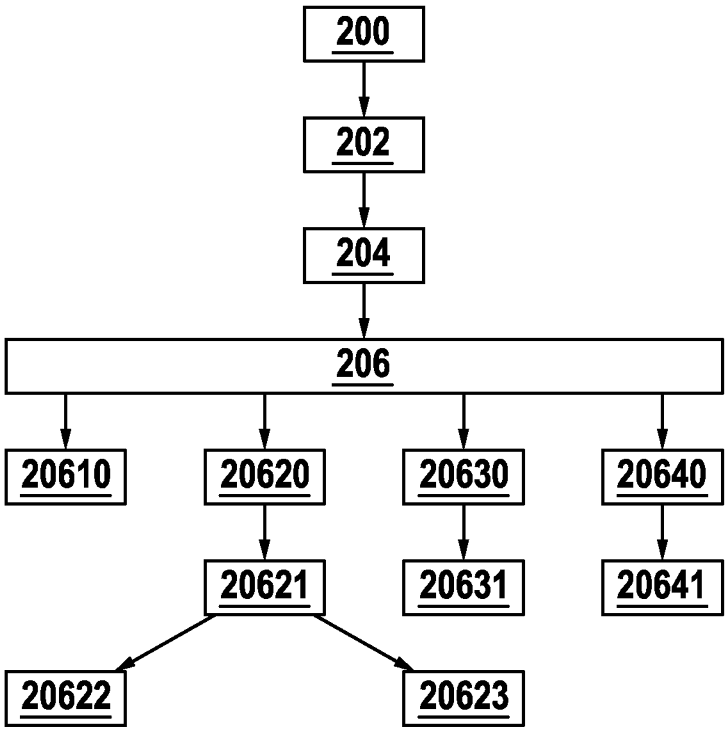
FIG. 2 a flowchart of a method according to an exemplary embodiment of the disclosure.

FIG. 2 shows a flowchart of an embodiment of the method in which a user can configure the hand-held power tool 100 to run in gentle mode via software (“app”) running on a terminal device such as a computer, smartphone, or tablet.

At 200, the control unit 370 of the hand-held power tool 100 is connected to the app running on the corresponding terminal device, for example via a wireless connection. Through a corresponding user interface of the app, it is possible to select an application class from a group of application classes and an operation mode from an operation mode group.

For this purpose, the user selects an application class at 202 in method step S1, for example the application class "soft screwdriving" or the application class "hard screwdriving", the latter represented for example in the app by the application "metal screw".

In the embodiment shown in FIG. 2, the selection of the operation mode in step S2 is also performed by the user via the app.

For this purpose, it selects at 204 in method step S2, for example, the second operation mode, which is a gentle mode as already mentioned. This has the effect, at 206, of reducing the maximum torque level of the hand-held power tool 100 from a maximum torque level possible when the first mode of operation is selected, regardless of any other adjustments that the user may make.

In further operation of the hand-held power tool, the following further method steps, among others, can be carried out:

The user can deactivate the gentle mode at 20610. In this case, the machine automatically switches back to the first operation mode.

Alternatively, at 20620, the user may connect the hand-held power tool to another terminal device, such as another smartphone. In this case, a query is made via the app running on the new end device as to whether the settings saved in the hand-held power tool 100 should be adopted or overwritten. In the case where the user selects "Apply", the settings stored in the control unit 370 at 20622 are applied in the app, and in the case where the user selects "Overwrite", the settings stored in the control unit 370 of the hand-held power tool 100 are overwritten by preset settings by the app.

At 20630, if the battery pack 190 of the hand-held power tool 100 is removed for a defined short period of time, for example, for the duration of a battery pack change, the application class and operation mode selection made by the user at 20631 remains active.

On the other hand, at 20640, if the battery pack 190 is removed for a period of time that exceeds a defined limit value set for a "short period of time", which limit value may be, for example, 30 s, 60 s, or 5 minutes, the user's selection of application class and operation mode is overwritten by preset settings.

In this way, by deliberate user setting of the gentle mode, the hand-held power tool 100 can be configured in a manner specific to the application or user in such a way that, in the soft screwdriving, work is performed at maximum power, while in the hard screwdriving, work can be performed at reduced power, but optimized for the strength of the insert tool.

Figure 3:
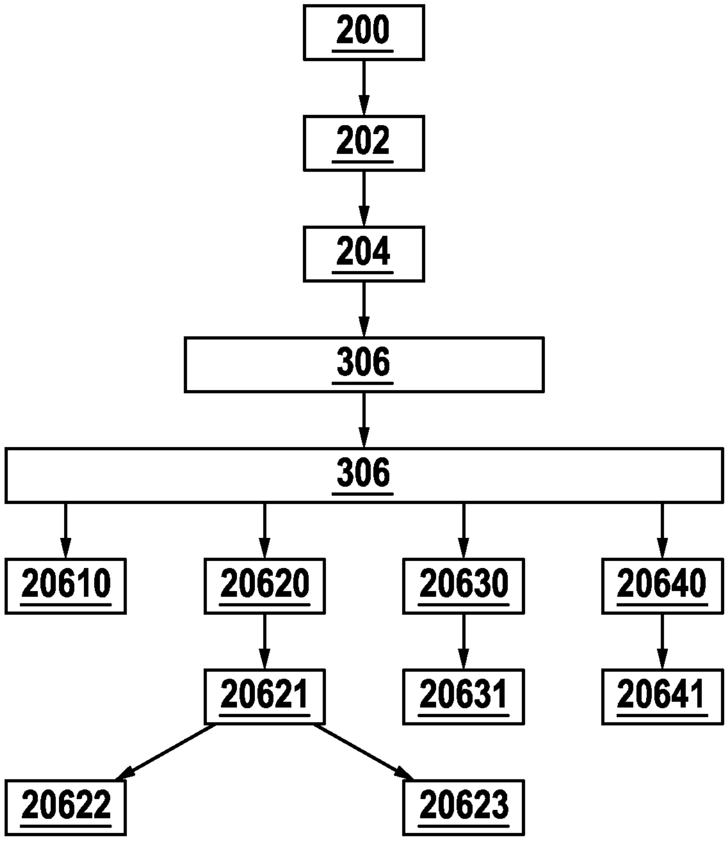
FIG. 3 a flowchart of a method according to an exemplary embodiment of the disclosure.

FIG. 3 shows an embodiment in which the user can make certain other settings in the app, which is explained in more detail below. As in the embodiment shown in FIG. 2, the selection of the application class in step S1 and the selection of the operation mode in step S2 are performed by the user, via the app.

For the steps in FIG. 3, which have identical reference numbers as the steps described in FIG. 2, the above explanations for FIG. 2 apply accordingly. For example, at 200, the control unit 370 of the hand-held power tool 100 is connected to the app running on the corresponding terminal device. At 202, the user selects the application class, and at 204, the user selects the second operation mode, which in the example is the gentle mode.

At 305, in contrast to the embodiment shown in FIG. 2, the user makes further settings, wherein these settings can be managed in a menu of the app, for example, in different subgroups, for example, in the groups "Basic", "Performance", and "Expert", each of which can allow different configuration depths of the operation of the hand-held power tool 100, for example, certain start-up characteristics of the electric motor 180, and can also be different with respect to the preassignment of certain operating parameters, such as the preset torque.

At 306, the maximum torque level of the hand-held power tool 100 is thereupon limited independently of all other settings, taking into account different accessories used with the hand-held power tool 100 and their load capacity in determining the torque level. In addition, the settings made in step 305 are taken into account, for example different torque horizons between the "Basic", "Performance", and "Expert" groups.

The further steps shown in FIG. 3, which can be performed starting from 306, correspond to the steps described in connection with FIG. 2, which can be performed starting from 206.

Figure 4:
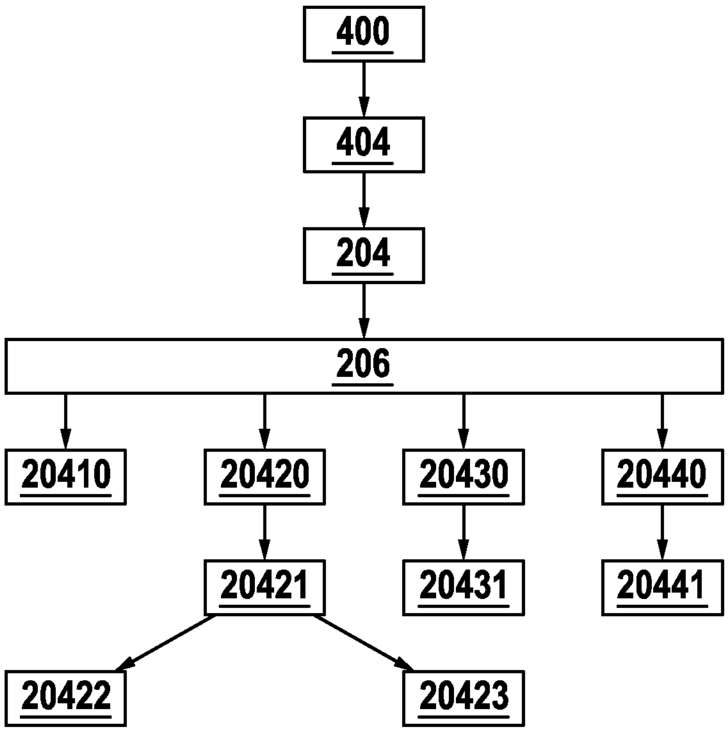
FIG. 4 a flowchart of a method according to an exemplary embodiment of the disclosure.

FIG. 4 shows an embodiment in which the user selects the application class in method step S1 and the operation mode in method step S2 by means of a human-machine interface (HMI), or alternatively by means of a pushbutton, directly on the hand-held power tool.

Again, the steps in FIG. 4, which have identical reference numbers as the steps described in FIG. 2, are subject to the above comments on FIG. 2 accordingly.

At 400, unlike the embodiments of FIGS. 2 and 3, it is not necessary for the hand-held power tool 100 to be connected to an app.

The user can activate and change preset speed levels and other operating parameters at 400 via the HMI, and also select the application class via the HMI (in method step S1). Optionally, these presets can also be personalized and changed via an app.

At 404, in the example, the user selects the second operation mode (for example, the "gentle mode") (in method step S2), either via the HMI or, if the hand-held power tool has a pushbutton provided for this purpose, via this very pushbutton.

As in the example of FIG. 2, the effect of this is that at 206, the maximum torque level of the hand-held power tool 100 is reduced from a maximum torque level possible when the first mode of operation is selected, regardless of any other adjustments that the user may make.

The further steps shown in FIG. 4, which can be performed starting from 406, correspond to the steps described in connection with FIG. 2, which can be performed starting from 206.

Figure 5:
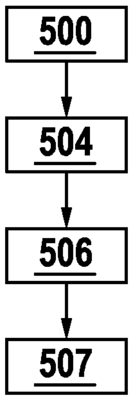
FIG. 5 a flowchart of a method according to an exemplary embodiment of the disclosure.

FIG. 5 shows an embodiment in which the gentle mode is activated for a period of time during which the user holds down a push button provided for this purpose at 504. In principle, therefore, the selection of the application class in step S1 and the selection of the operation mode in step S2 are also performed by the user in this embodiment, namely via the HMI.

At 500, the user can activate and change preset speed levels and other operating parameters via the HMI, and the user also selects the application class via the HMI (in method step S1). Optionally, these presets can also be personalized and changed via an app.

At 504, the user presses the pushbutton, thereby activating the gentle mode in method step S2. As in the example of FIG. 2, the effect of this is that at 506 the maximum torque level of the hand-held power tool 100 is reduced from a maximum torque level possible when the first mode of operation is selected, regardless of any other adjustments the user may make, but only for the period of time until the user releases the pushbutton at 507. The machine then automatically deactivates the gentle mode.

Figure 6:
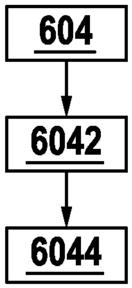
FIG. 6 a flowchart of a method according to an exemplary embodiment of the disclosure.

FIG. 6 shows an embodiment in which the selection of the application class in step S1 is performed by the user, for example as described in FIGS. 2 to 5, while the selection of the operation mode in step S2 is performed automatically.

At 604, the user can activate and change preset speed levels and other operating parameters via the app and the HMI, respectively, and the user also selects the application class via the app and the HMI, respectively (in method step S1). Optionally, these presets can also be personalized and changed via an app.

When the user starts a screwdriving operation at 6042, the control unit 370, for example by executing internal device software, automatically selects the application class (step S1). More details on how the application case is automatically selected are given below.

At 6044, the control unit 370, for example also by executing the internal device software, automatically selects the operation mode (step S2) based at least in part on the selected application class.

If the "hard screwdriving" application class is selected in step S1, the control unit 370 automatically selects the second operation mode in step S2, which is a gentle mode with reduced maximum torque level as described above.

If the "soft screwdriving" application class is selected in step S1, the control unit 370 automatically selects the first operation mode in step S2, which has a higher maximum torque level compared to the second operation mode.

The following describes the automatic selection of the application class in step S1 in more detail.

To this end, step S1 comprises the following steps:

S1.1 ascertaining a signal of an operating variable 200 of the electric motor 180;

S1.5 selecting the application class based at least in part on the signal of the operating variable 200.

Aspects of the method are based, among other things, on an examination of signal waveforms and a determination of a degree of the match between these signal waveforms and known signal waveforms, such as those that occur in hard and soft screwdriving, respectively.

Figures 7A, 7B:
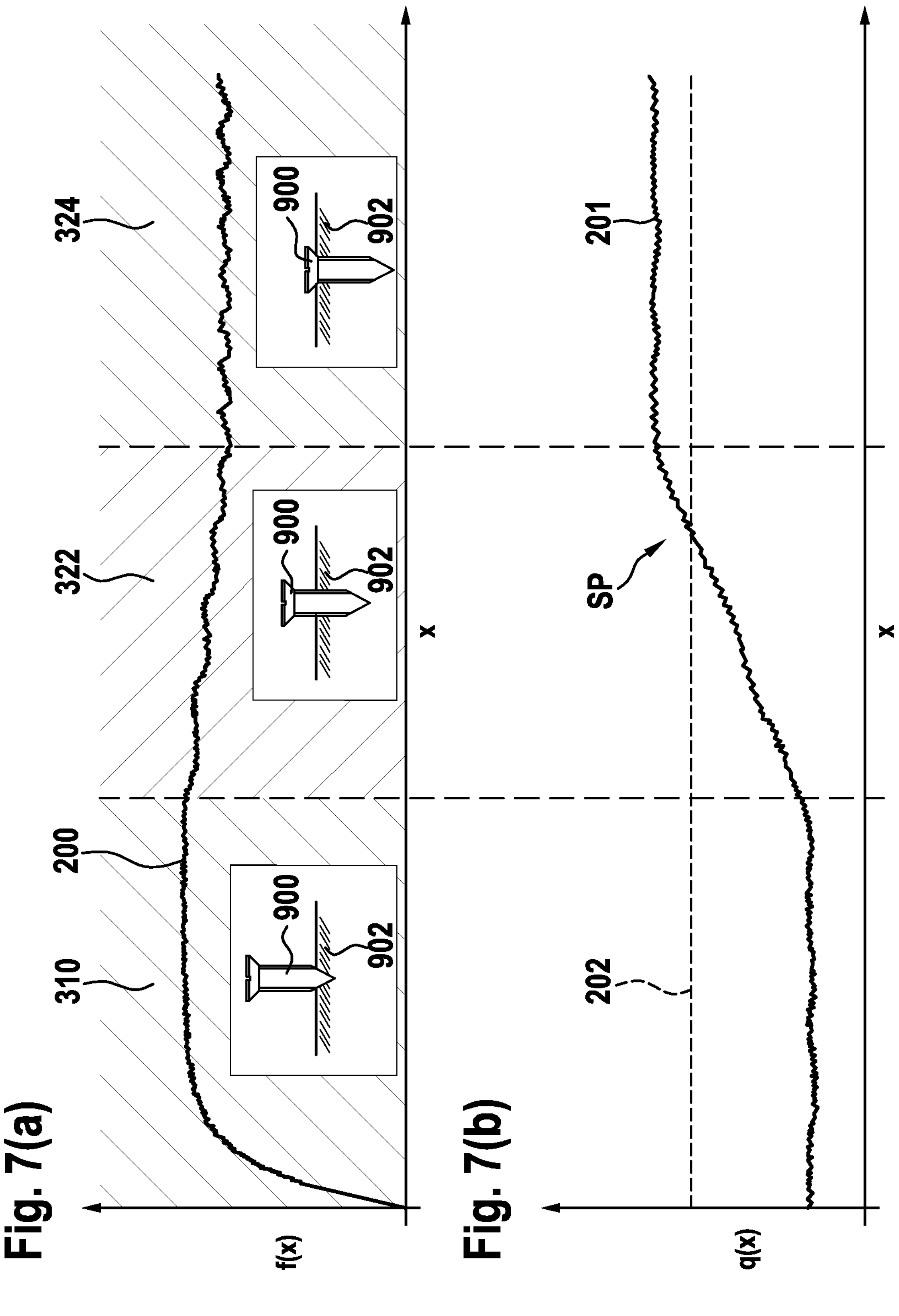
FIGS. 7*a-b* course of a signal of an operating variable and a function of a match according to an embodiment of the disclosure.

In FIG. 7, an exemplary signal of an operating variable 200 of an electric motor 180 of a rotary impact wrench, as occurs identically or similarly when using a rotary impact wrench as intended, is shown in this regard. While the following statements relate to a rotary impact wrench, they also apply mutatis mutandis in the context of the disclosure to other hand-held power tools 100, for example, impact drills.

In the present example of FIG. 2, the time is plotted on the abscissa x as a reference variable. However, in an alternative embodiment, a variable correlated with time is plotted as a reference variable, such as the angle of rotation of the tool holder 140, the angle of rotation of the electric motor 180, an acceleration, a jerking, in particular of a higher order, a power, or an energy. On the ordinate f(x) in the figure, the motor speed n present at each time point is plotted. Instead of the motor speed, another operating variable correlating to the motor speed can also be selected. In alternative embodiments of the disclosure, for example, f(x) represents a signal of motor current.

Motor speed and motor current are operating variables that are typically sensed by a control unit 370 on hand-held power tools 100, without any additional effort. In preferred embodiments of the disclosure, a user of the hand-held power tool 100 can select on the basis of which operating variable the disclosed method is to be carried out.

In FIG. 7(*a*), an application case of a loose fastening element, for example a screw 900, is shown in a fastening beam 902, for example a wooden board. It can be seen in FIG. 7(*a*) that the signal comprises a first region 310 characterized by a monotonous increase in motor speed, as well as a region of comparatively constant motor speed, which can also be referred to as a plateau. The intersection point between abscissa x and ordinate f(x) in FIG. 7(*a*) corresponds to the start of the rotary impact wrench during the screwdriving operation.

In the first region 310, the screw 900 encounters a relatively low resistance in the fastening beam 902, and the torque required for screwing is below the disengagement torque of the rotary impact mechanism. The course of the motor speed in the first region 310 thus corresponds to the operating state of the screw without impact.

As can be seen in FIG. 7(*a*), the head of the screw 900 in the region 322 does not rest on the fastening beam 902, which means that the screw 900 driven by the rotary impact wrench is continually rotated with each impact. This additional rotary angle can decrease as the working operation proceeds, which is reflected in the figure by a smaller period duration. In addition, a further screwing can also be shown by a decreasing rotational speed on average.

If the head of the screw 900 subsequently reaches the support 902, an even higher torque and thus more impact energy is necessary for further screwing in. However, because the hand-held power tool 100 no longer provides impact energy, the screw 900 no longer rotates, or only by a significantly smaller rotational angle.

The rotary impact wrench operation carried out in the second 322 and third region 324 is characterized by an oscillating course of the signal of the operating variable 200, wherein the shape of the oscillation can be trigonometric or otherwise oscillating, for example. In the present case, the oscillation has a course which can be referred to as a modified trigonometric function. This characteristic shape of the signal of the operating variable 200 in the impact screwing operation results from the drawing up and free-running of the impact mechanism striker and the system chain located between the impact mechanism and the electric motor 180, among others, of the transmission 170.

The qualitative signal waveform of the impact operation is thus generally known due to the inherent characteristics of the rotary impact wrench. In embodiments of the method in which the selection of the application case is performed automatically in step S1, at least one state-typical model signal waveform 240 is provided in a step S1.2 based on this knowledge, wherein the state-typical model signal waveform 240 is assigned to an application class, for example a soft or a hard screwdriving, respectively. In other words, the state-typical model signal waveform 240 contains typical characteristics for the application class such as the presence of a vibration course, vibration frequencies or amplitudes, or individual signal sequences in continuous, quasi-continuous, or discrete form.

In other applications, the application class can be characterized by signal waveforms other than vibrations, such as by discontinuities or growth rates in the function f(x). In such cases, the state-typical model signal waveform is characterized by precisely these parameters, rather than vibrations.

In a preferred configuration of the disclosed method, in method step S1.1, the state-typical model signal waveform 240 can be defined by a user. The state-typical model signal waveform 240 can also be stored or deposited in the device. In an alternative embodiment, the state-typical model signal waveform can alternatively and/or additionally be provided to the hand-held power tool 100, for example, from an external data device.

In a method step S1.3 of the method according to the disclosure, the signal of the operating variable 200 of the electric motor 180 is compared to the state-typical model signal waveform 240. The feature "comparing" is to be interpreted broadly and in the sense of a signal analysis in the context of the present disclosure, so that a result of the comparison can in particular also be a partial or gradual match of the signal of the operating variable 200 of the electric motor 180 to the state-typical model signal waveform 240, wherein the degree of matching of the two signals can be ascertained by various mathematical methods, which will be mentioned later.

In step S1.3, a match score of the signal of the operating variable 200 of the electric motor 180 is also ascertained from the comparison to the state-typical model signal waveform 240, and thus a conclusion about the match of the two signals is made. Here, the performance and sensitivity of the match score are factory or user adjustable parameters for the detection of the application class.

FIG. 7(*b*) shows a course of a function q(x) of a match score 201 corresponding to the signal of the operating variable 200 of FIG. 7(*a*), which indicates a value of the match between the signal of the operating variable 200 of the electric motor 180 and the state-typical model signal waveform 240 at each location of the abscissa x.

In the present example of the screwing in of the screw 900, this evaluation is used in order to determine the extent of continued rotation for one impact. In the example, the state-typical model signal waveform 240 predetermined in step S1.1 corresponds to an ideal impact without further rotation, that is to say, the state in which the head of the screw 900 rests on the surface of the fastening beam 902, as shown in region 324 of FIG. 7(*a*). Accordingly, in the region 324, there is a high matching of the two signals, which is reflected by a consistently high value of the function q(x) of the match score 201. In the region 310, on the other hand, in which each impact is associated with high rotational angles of the screw 900, only small match values are achieved. The less the screw 900 continues to rotate in the impact, the higher this match, which can be seen from the fact that the function q(x) of the match score 201 already reflects continuously increasing match values when the impact mechanism in the region 322 is started, which is characterized by a continuously smaller rotational angle of rotation of the screw 200 due to the increasing screw-in resistance.

In a method step S1.4 of the method according to the disclosure, the application class is now at least partly detected based on the match score 201 ascertained in method step S1.3. For example, detecting the application class can be done at least partly by comparing the match score 201 to the threshold value, which is indicated by a dashed line 202 in FIG. 7*b*. In the present example of FIG. 7*b*, the intersection point SP of the function q(x) of the match score 201 with line 202 is associated with the work progress of abutting the head of the screw 900 on the surface of the fastening beam 902.

The criterion derived from this, which is used to determine the presence of a certain application class, can be adjustable in order to make the function usable for a wide variety of use cases. It should be noted that the function is not limited to screw-in applications, but also includes use in unscrewing applications.

In order to identify the presence of a particular application class, for example, the hard or soft screwdriving, in the method described herein, various model waveforms, each of which is assigned to different application classes, can be successively examined using the method steps S1.1 to S1.4 described above, and if the signal of the operating variable 200 of the electric motor 180 corresponds sufficiently well to one of the state-typical model signal waveforms, the application class corresponding to this model signal waveform is detected and selected.

According to the disclosure, an application class can thus be identified and automatically selected by distinguishing signal waveforms.

Some technical correlations and embodiments regarding the performance of the method steps S.1-S1.4 will now be explained below.

In practical applications, it can be provided that method steps S1.2 and S1.3 can be carried out repeatedly during operation of a hand-held power tool 100 in order to monitor the existence of the application class. For this purpose, in method step S1.1, a segmentation of the ascertained signal of the operating variable 200 can be carried out, so that the method steps S1.2 and S1.3 are carried out on signal segments, preferably always of the same defined length.

For this purpose, the signal of the operating variable 200 can be stored in a memory, preferably a ring memory, as a result of measured values. In this embodiment, the hand-held power tool 100 comprises the memory, preferably the ring memory.

As already mentioned in connection with FIG. 7, in preferred embodiments of the disclosure, in method step S1, the signal of the operating variable 200 is ascertained as a time course of measured values of the operating variable, or as measured values of the operating variable as a variable of the electric motor 180 correlating to the time course. The measured values can be discrete, quasi-continuous, or continuous.

One embodiment provides that the signal of the operating variable 200 is received in method step S1.1 as a time course of measured values of the operating variable and, in a method step S1.1a following method step S1.1, there is a transformation of the time course of the measured values of the operating variable into a course of the measured values of the operating variable as a variable of the electric motor 180 that correlates to the time course, such as the rotational angle of the tool holder 140, the motor rotational angle, an acceleration, a jerking, in particular of a higher order, a power, or an energy.

Figure 8A:
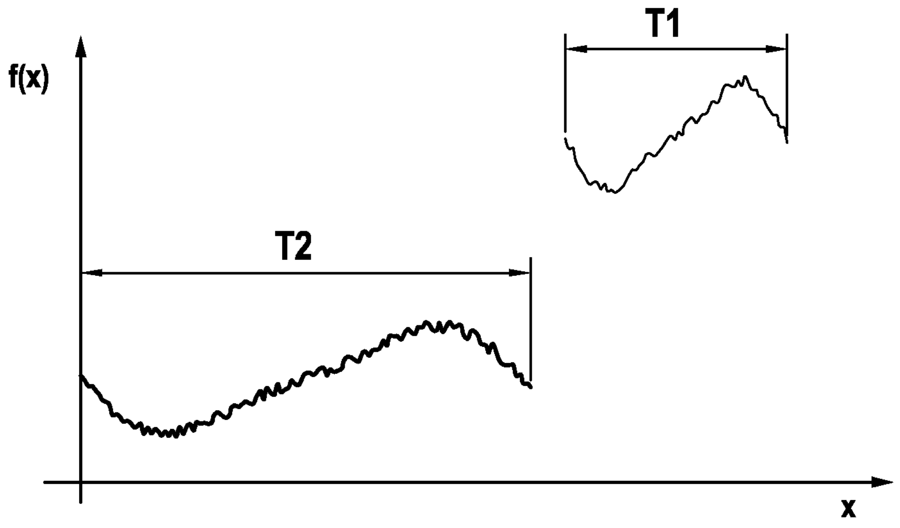
FIGS. 8*a-b* a schematic illustration of two different records of the signal of the operating variable.

The advantages of this embodiment will be described below with reference to FIG. 8. Similar to FIG. 2, FIG. 8*a* shows signals f(x) of an operating variable 200 over an abscissa x, in this case over the time t. As in FIG. 7, the operating variable can be a motor speed or a parameter correlating to the motor speed.

The figure contains two signal courses of the operating variable 200, each of which can be assigned to an application class, in the case of a rotary impact wrench, for example, a hard screwdriving. In this case, the signal comprises a wavelength of an idealized vibration course assumed to be sinusoidal, wherein the shorter wavelength signal, T1, has a course with higher impact frequency and the longer wavelength signal, T2, has a course with a lower impact frequency.

Both signals can be generated with the same hand-held power tool 100 at different motor speeds, and are dependent on, among other things, which revolution speed the user requests from the hand-held power tool 100 via the user switch.

If, for example, the parameter "wavelength" is now to be used in order to define the state-typical model signal waveform 240, at least two different wavelengths T1 and T2 would have to be stored as possible parts of the state-typical model signal form for the present case, so that the comparison of the signal of the operating variable 200 with the state-typical model signal waveform 240 in both cases leads to the result "match." Because the motor speed can change generally and to a large extent over time, this also causes the wavelength sought to vary, thereby requiring the methods for detecting this impact frequency to be adjusted adaptively accordingly.

With a plurality of possible wavelengths, the effort of the method and programming would increase accordingly.

Figure 8B:
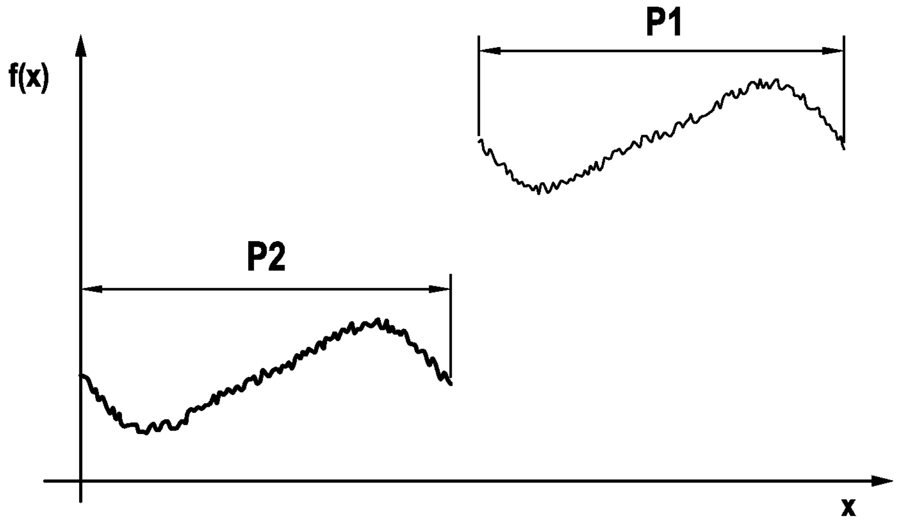

Thus, in the preferred embodiment, the time values of the abscissa are transformed into values correlating to the time values, such as acceleration values, jerking values of a higher order, power values, energy values, frequency values, rotational angle values of the tool holder 140, or rotational angle values of the electric motor 180. This is possible because the rigid gear ratio of the electric motor 180 to the impact mechanism and the tool holder 140 results in a direct, known dependence of motor speed on the impact frequency. This normalization achieves a vibration signal of consistent periodicity independent of the motor speed, which is shown in FIG. 8*b* by the two signals belonging to T1 and T2, wherein both signals now have the same wavelength P1=P2.

Accordingly, in this embodiment of the disclosure, the state-typical model signal waveform 240 can be validly ascertained for all speeds by a single parameter of the wavelength above the variable correlated to time, such as the rotational angle of the tool holder 140, the motor rotational angle, an acceleration, a jerking, in particular of a higher order, a power, or an energy.

In a preferred embodiment, the comparison of the signal of the operating variable 200 in method step S1.3 is carried out with a comparison method, wherein the comparison method comprises at least one frequency-based comparison method and/or one comparative comparison method. The comparison method compares the signal of the operating variable 200 with the state-typical model signal waveform 240 to determine whether at least one predetermined threshold value is met. The comparison method compares the measured signal of the operating variable 200 with at least one predetermined threshold value. The frequency-based comparison method comprises at least band-pass filtering and/or frequency analysis. The comparative comparison method comprises at least the parameter estimate and/or the cross-correlation. The frequency-based and comparison methods will be described in further detail below.

In band-pass filtering embodiments, the input signal, optionally as described, transformed to a variable that correlates to the time, is filtered via one or more band-passes whose pass-through regions correspond to one or more state-typical model signal waveforms. The pass-through region results from the state-typical model signal waveform 240. It is also conceivable that the pass-through region will agree with a frequency established in connection with the state-typical model signal waveform 240. In the case where amplitudes of this frequency exceed a predetermined limit value, as is the case when a particular application class is present, the comparison in method step S1.3 then leads to the result that the signal of the operating variable 200 resembles the state-typical model signal waveform 240, and that the application class to be detected is thus present. Determining an amplitude limit value can be considered in this embodiment as ascertaining the match score of the state-typical model signal waveform 240 with the signal of the operating variable 200, on the basis of which it is decided whether the application class to be detected is present or not in method step S1.4. If the application class to be detected is not present, a further step may involve comparing another state-typical model signal waveform 240 associated with a different application class with the signal of the operating variable. This can be done for as long as necessary, and cyclically if necessary, until a specific application class is detected.

Figures 9A, 9B, 9C:
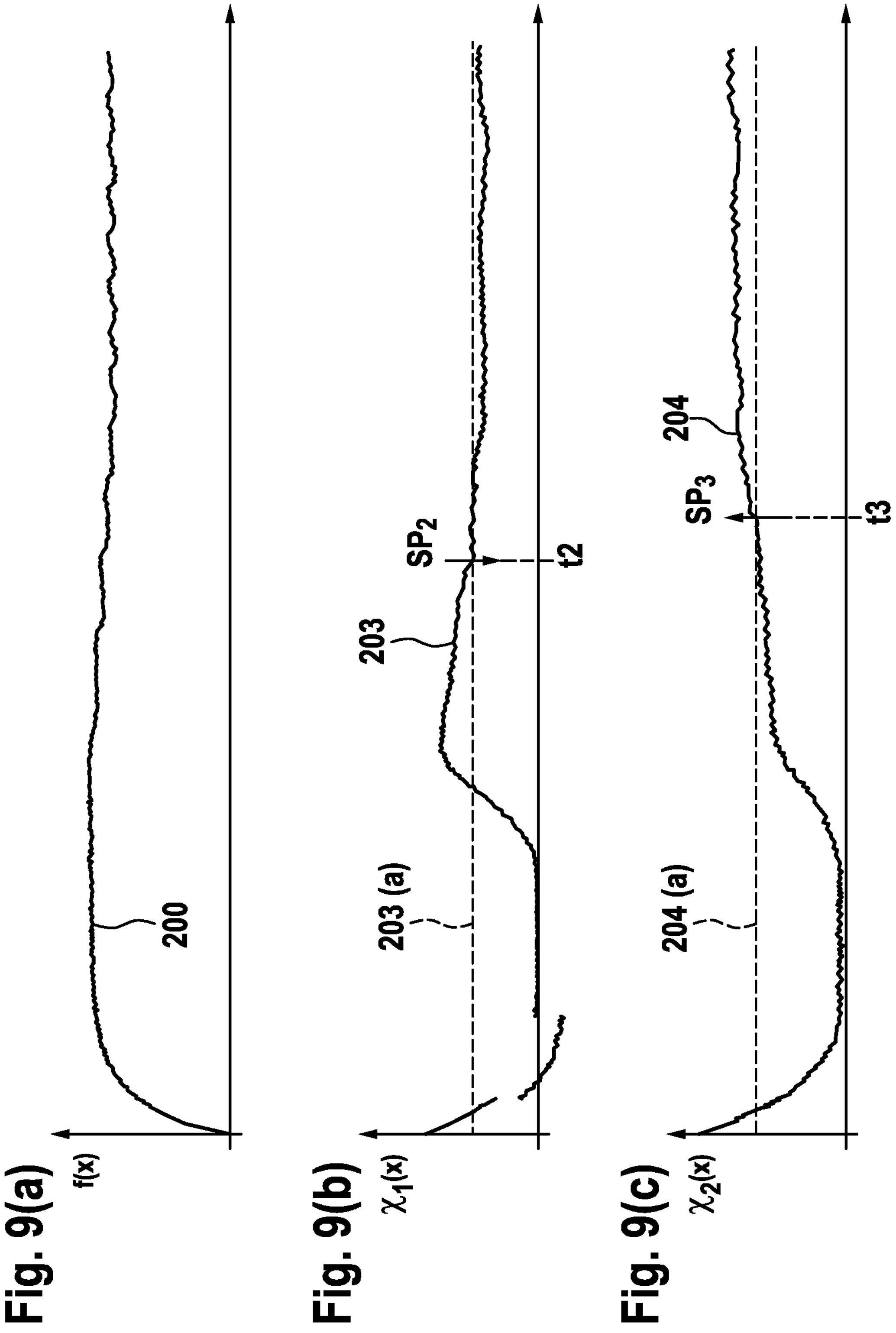
FIG. 9(*a*) a signal of an operating variable.
Figure 10A:
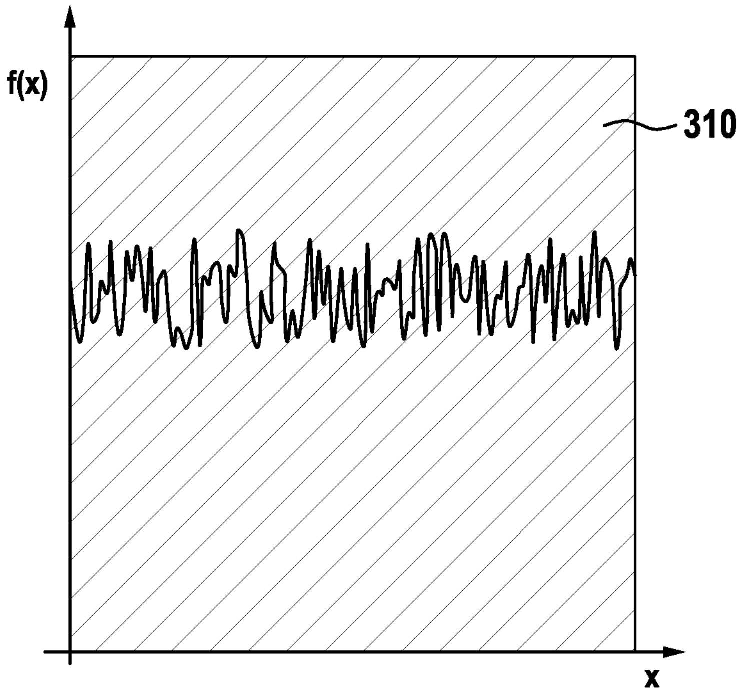
FIGS. 10*a-d* a common illustration of a signal of an operating variable and an output of a frequency analysis based on a model signal.
Figure 10B:
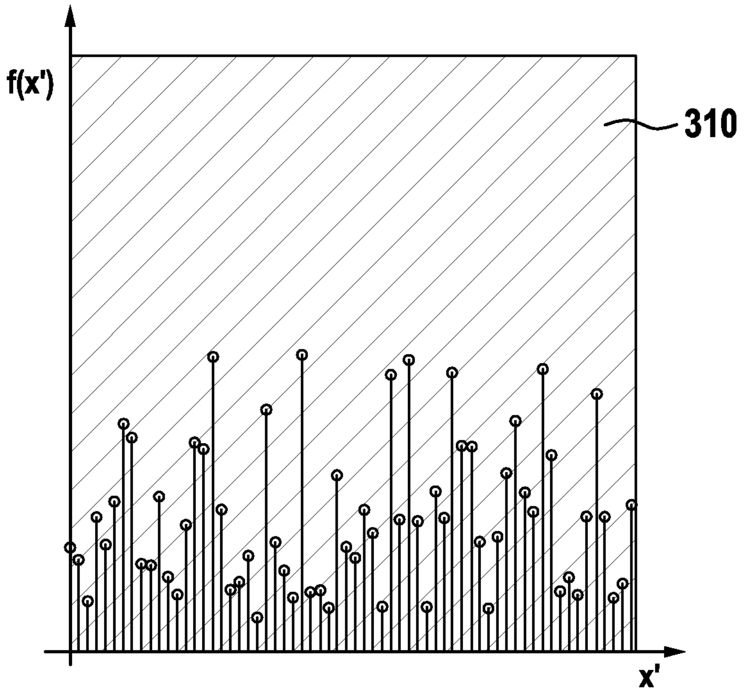
Figure 10C:
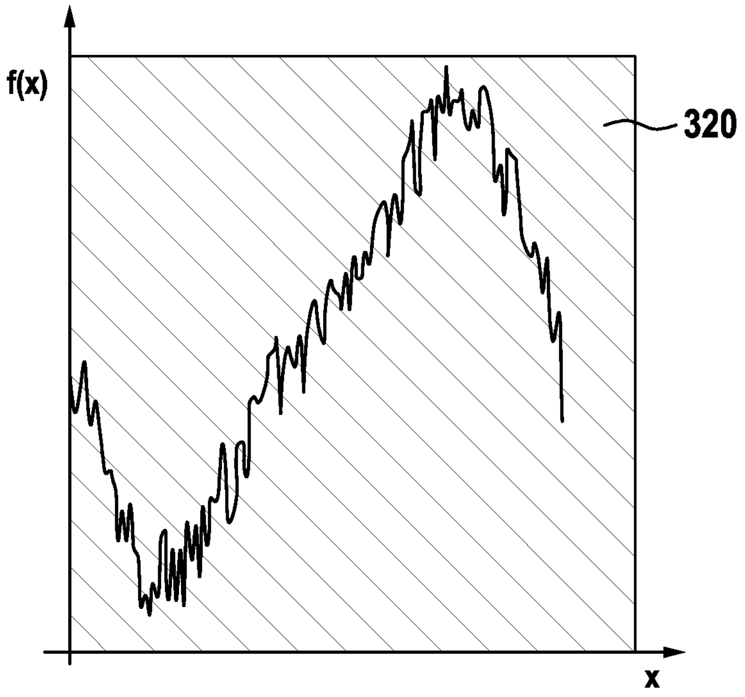
Figure 10D:
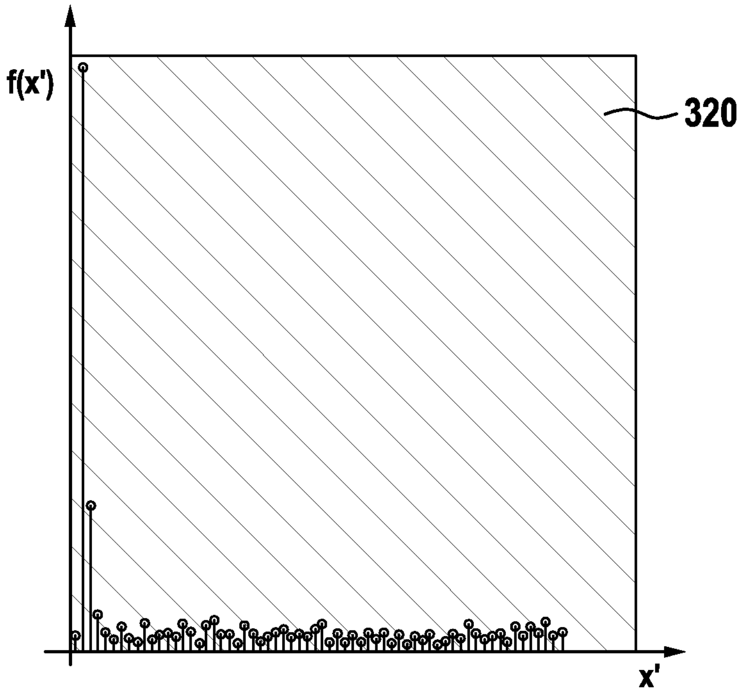

Based on FIG. 9, the embodiment is to be explained in which frequency analysis is used as a frequency-based comparison method. In this case, the signal of the operating variable 200 shown in FIG. 9(*a*), for example corresponding to the course of the speed of the electric motor 180 over time, is transformed from a time range to the frequency range with corresponding weighting of the frequencies based on the frequency analysis, for example the fast Fourier transformation (FFT). In this respect, the term "time range" according to the above statements is to be understood both as a "course of the operating variable over time" as well as a "course of the operating variable as a variable correlating with time."

The frequency analysis in this characteristic is well known as a mathematical tool for signal analysis from many regions of technology and is used, among other things, to approximate measured signals as serial developments of weighted periodic, harmonic functions of different wavelengths. In FIGS. 9(*b*) and 9(*c*), for example, weighting factors $x_1(x)$ and $x_2(x)$ as functional courses 203 and 204 indicate over time whether and how much the corresponding frequencies or frequency bands, which are not specified at this point for the sake of clarity, are present in the investigated signal, i.e., the progression of the operating variable 200.

With respect to the method according to the disclosure, it can be ascertained whether and at what amplitude the frequency associated with the state-typical model signal waveform 240 is present in the signal of the operating variable 200 using the frequency analysis. Moreover, however, frequencies can also be defined whose absence is a measure of the work progress to be detected. As mentioned in the context of band-pass filtering, a limit value of the amplitude can be established, which is a measure of the degree of the match of the signal of the operating variable 200 to the state-typical model signal waveform 240.

In the example of FIG. 9(*b*), for example, at time $t_2$ (point $SP_2$), the amplitude $x_1(x)$ of a first frequency, which is typically not found in the signal of the operating variable 200 in the state-typical model signal waveform 240, falls below an associated limit value 203(*a*), which in the example is a necessary but insufficient criterion for the existence of the specific application class. At time $t_3$ (point $SP_3$), the amplitude $x_2(x)$ of a second frequency typically found in the state-typical model signal waveform 240 in the signal of the operating variable 200, exceeds an associated limit value 204(*a*). In the associated embodiment of the disclosure, the common presence of falling short of or exceeding the limit values 203(*a*), 204(*a*) due to the amplitude functions $x_1(x)$ or $x_2$ (x) is the relevant criterion for the evaluation of the match of the signal of the operating variable 200 with the state-typical model signal waveform 240. Accordingly, in this case, it is determined in method step S1.4 that the application class to be detected exists.

In alternative embodiments of the disclosure, only one of these criteria is used, or combinations of either or both criteria are used with other criteria.

In embodiments in which the comparison method is used, the signal of the operating variable 200 is compared to the state-typical model signal waveform 240 to determine whether the measured signal of the operating variable 200 has at least a 50% match with the state-typical model signal waveform 240, and thus the specified threshold value is reached. It is also conceivable that the signal of the operating variable 200 will be compared with the state-typical model signal waveform 240 in order to ascertain a match between the two signals.

In embodiments of the method according to the disclosure in which the parameter estimate is used as a comparative comparison method, the measured signal of the operating variables 200 is compared to the state-typical model signal waveform 240, wherein estimated parameters are identified for the state-typical model signal waveform 240. Using the estimated parameters, a measure of the match of the measured signal of the operating variables 200 with the state-typical model signal waveform 240 can be ascertained as to whether the application class to be detected exists. The parameter estimate is based on the compensatory calculation, which is a mathematical optimization method known to the person skilled in the art. The mathematical optimization method, using the estimated parameters, makes it possible to adjust the state-typical model signal waveform 240 to a series of measurement data of the signal of the operating variable 200. Depending on a measure of the match between the state-typical model signal waveform 240 parameterized using the estimated parameters and a limit value, a decision can be made as to whether the application class to be detected is present.

Using the compensatory calculation of the comparison method of parameter estimation, a measure of a match of the estimated parameters of the state-typical model signal waveform 240 to the measured signal of the operating variable 200 can also be ascertained.

To decide whether there is a sufficient match or a sufficiently low comparison of the state-typical model signal waveform 240 with the estimated parameters to the measured signal of the operating variable 200, a comparison determination is performed in method step S1.3 following method step S1.3a. If the comparison from the state-typical model signal waveform 240 to the measured 70% signal of the operating variable is ascertained, a decision can be made as to whether the application class to be detected has been identified based on the signal of the operating variable.

In order to decide whether there is sufficient match between the state-typical model signal waveform 240 and the signal of the operating variable 200, in a further embodiment, a quality determination for the estimated parameters is performed in a method step S1.3b following the method step S1.3. In the quality determination, values are ascertained for a quality between 0 and 1, where a lower value means a higher confidence in the value of the identified parameter and thus represents a higher match between the state-typical model signal waveform 240 with the signal of the operating variable 200. In the preferred embodiment, the decision as to whether the application class to be detected is present is made in method step S1.4 at least in part on the basis of the condition that the value of the quality lies in a range of 50%.

In one embodiment of the disclosed method, the method of cross-correlation is used as the comparative comparison method in the method step S1.3. Like the mathematical methods described above, the method of cross-correlation is known to the person skilled in the art. In the cross-correlation method, the state-typical model signal waveform 240 is correlated to the measured signal of the operating variable 200.

Compared to the method of parameter estimation presented above, the result of the cross-correlation is again a signal sequence with an added signal length from a length of the signal of the operating variable 200 and the state-typical model signal waveform 240, which represents the similarity of the time-offset input signals. The maximum of this output sequence represents the point in time of the highest match of the two signals, i.e., the signal of the operating variable 200 and the state-typical model signal waveform 240, and is thus also a measure of the correlation itself, which in this embodiment is used in method step S1.4 as a decision criterion for the presence of the application class to be detected. In the implementation in the method according to the disclosure, a significant difference compared to the parameter estimate is that any of the state-typical model signal waveforms can be used for the cross-correlation, while in the parameter estimate, the state-typical model signal waveform 240 must be represented by parameterizable mathematical functions.

FIG. 10 shows the measured signal of the operating variable 200 in the event that the frequency analysis is used as the frequency-based comparison method. FIGS. 10*a* and *b* show the first region 310 in which the hand-held power tool 100 is in the screwing operation. On the abscissa x of FIG. 10*a*, the time t or a variable correlated to time is plotted. In FIG. 10*b*, the signal of the operating variable 200 is shown transformed, wherein, for example, by means of a fast Fourier transformation, it can be transformed from a time range into a frequency range. For example, the frequency f is plotted on the abscissa x' of FIG. 10*b* so that the amplitudes of the signal of the operating variable 200 are represented. FIGS. 10*c* and *d* show the second region 320 in which the hand-held power tool 100 is in rotary impact operation. FIG. 10*c* shows the measured signal of the operating variable 200 plotted over time in the rotary impact operation. FIG. 10*d* shows the transformed signal of the operating variable 200, wherein the signal of the operating variable 200 is plotted via the frequency f as an abscissa x'. FIG. 10*d* shows characteristic amplitudes for the rotary impact operation.

In a further embodiment, method step S1.3 comprises a step S1.3a of a quality determination of the identification of the model signal waveform in the signal of the operating variable, wherein, in method step S1.4, the detection of the application class is carried out at least in part on the basis of the quality determination. While the state-typical model signal waveform 240 has a substantially trigonometric course, the signal of the operating variable 200 has a course that is greatly different therefrom. Regardless of the choice of one of the comparison methods described above, in this case the comparison carried out in method step S1.3 between the state-typical model signal waveform 240 and the signal of the operating variable 200 results in the degree of the match of the two signals being so low that the application class to be detected is not detected in method step S1.4.

Figure 11A:
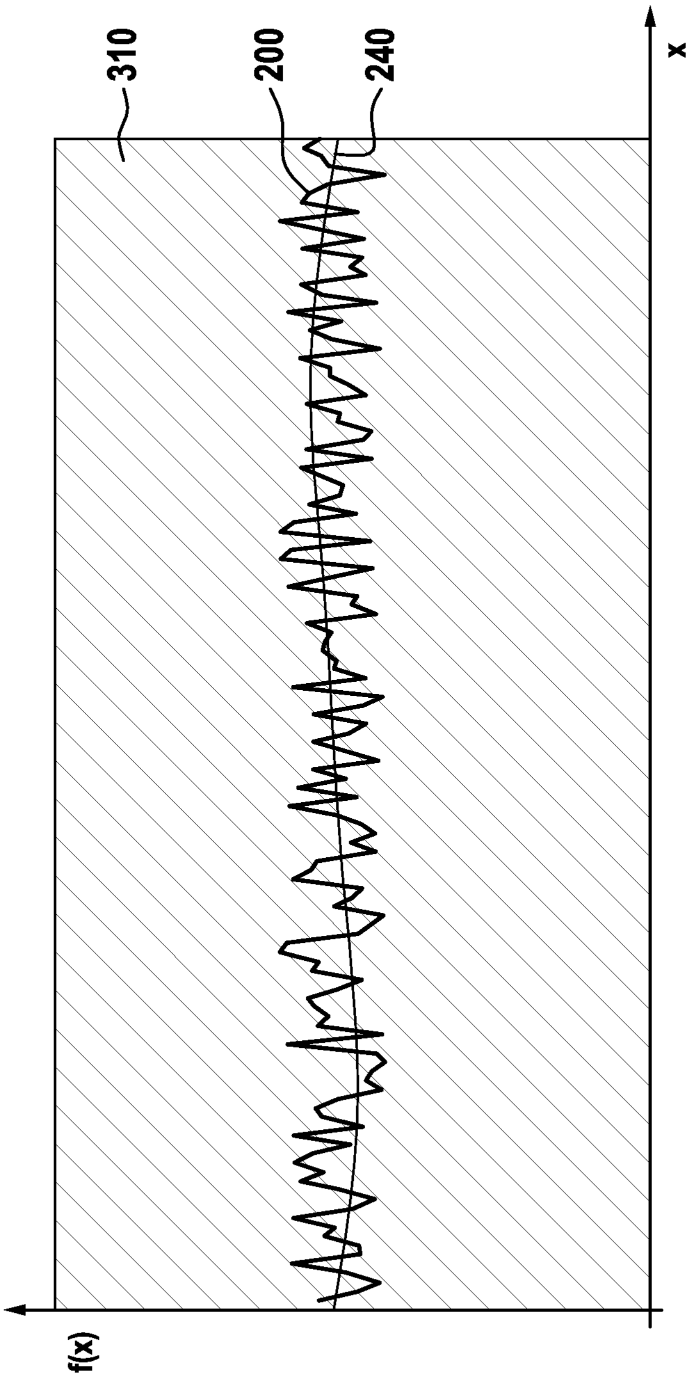
FIGS. 11*a-b* a common illustration of a signal of an operating variable and a model signal for parameter estimation.
Figure 11B:
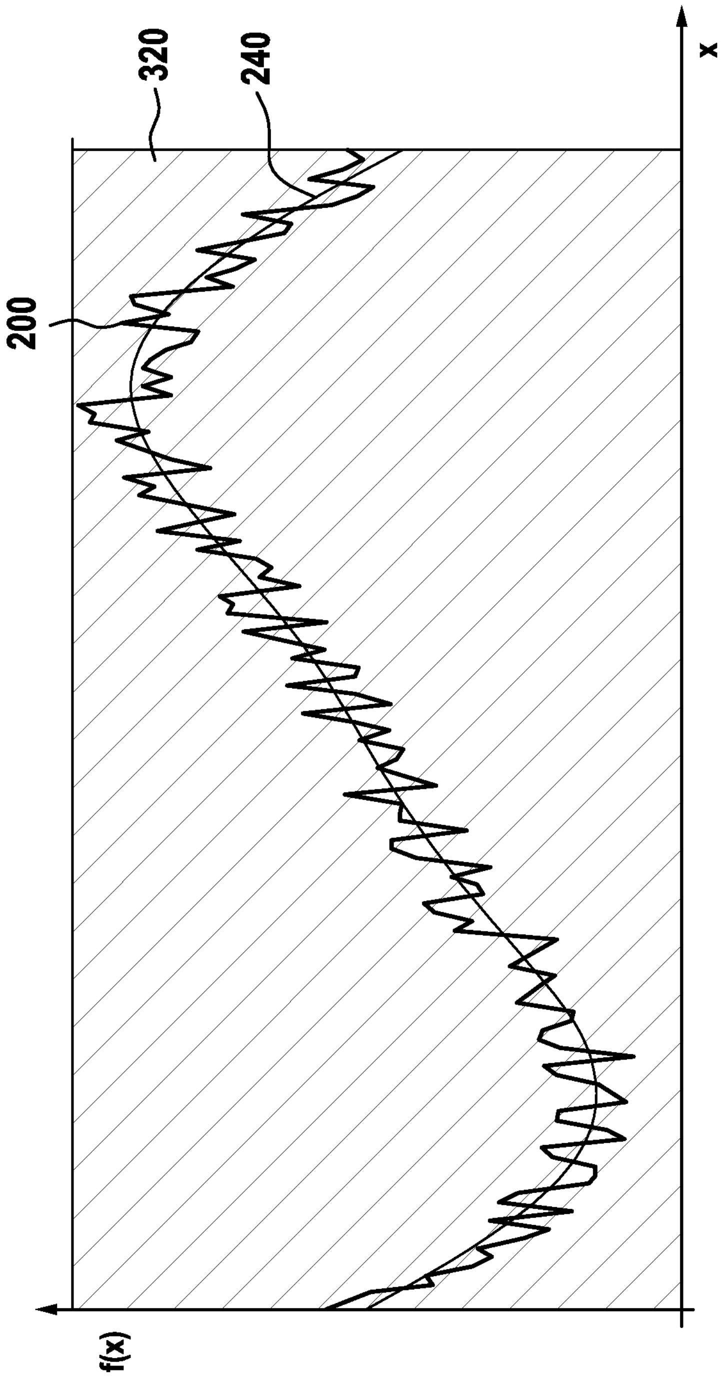

In FIG. 11b, on the other hand, the case is shown in which the application class to be detected is given and therefore the state-typical model signal waveform 240 and the signal of the operating variable 200 have a high overall degree of the match, even if deviations can be detected at individual measurement points. Thus, in the comparison method of parameter estimation, the decision as to whether the application class to be detected has been achieved can be made.

Figure 12A:
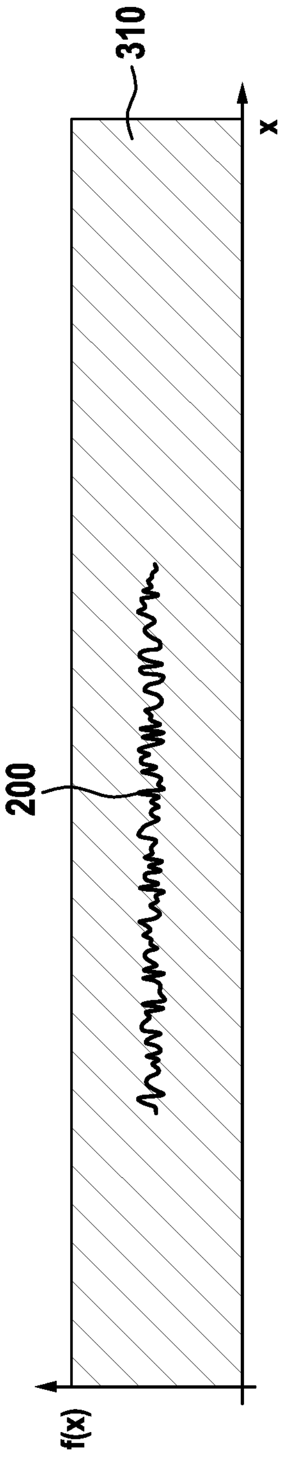
FIGS. 12*a-f* a common illustration of a signal of an operating variable and a model signal for the cross-correlation, and FIG. 13 a flowchart of a method according to an embodiment example of the disclosure.
Figure 12B:
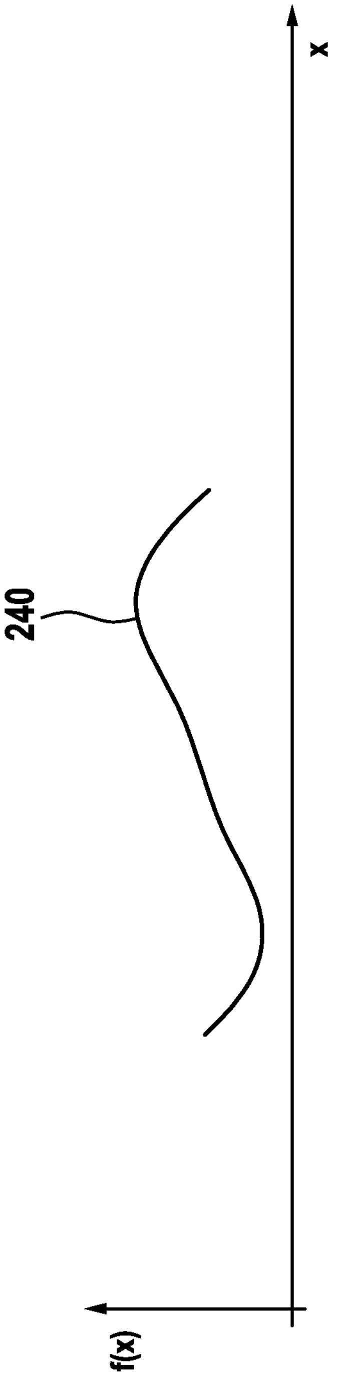
Figure 12C:
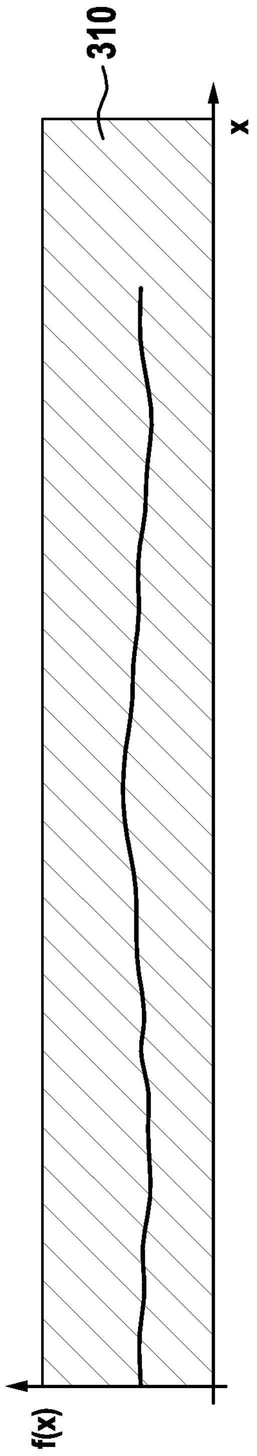
Figure 12D:
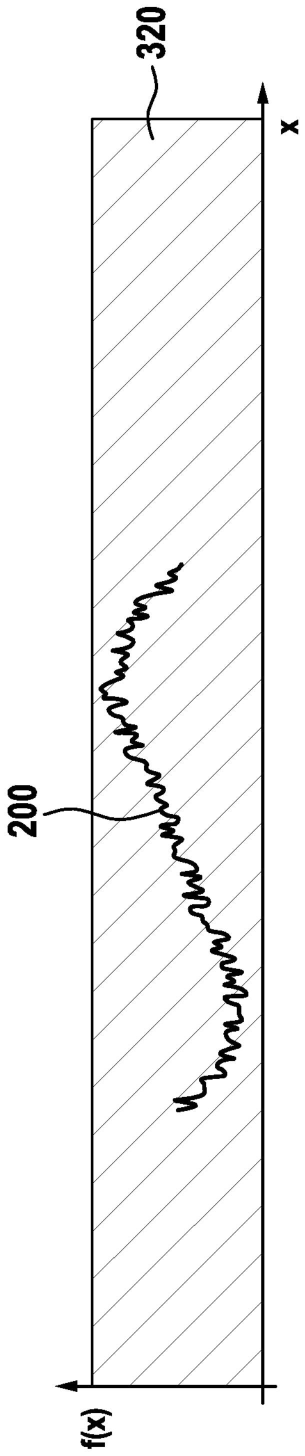
Figure 12E:
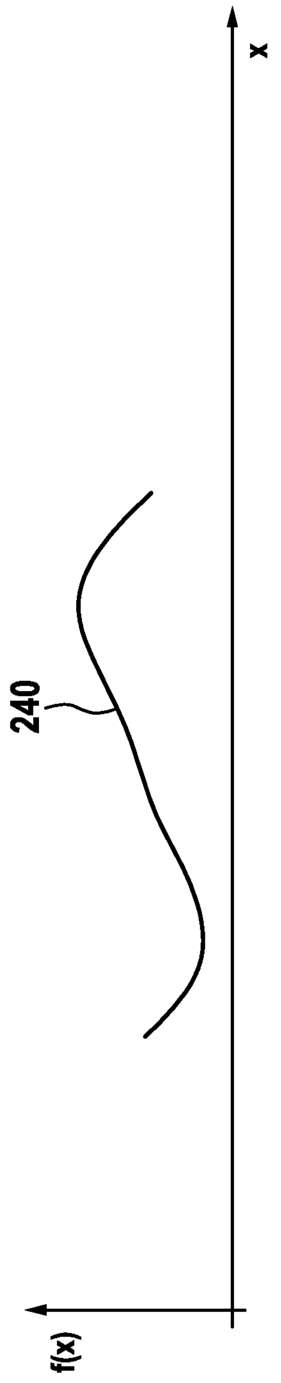
Figure 12F:
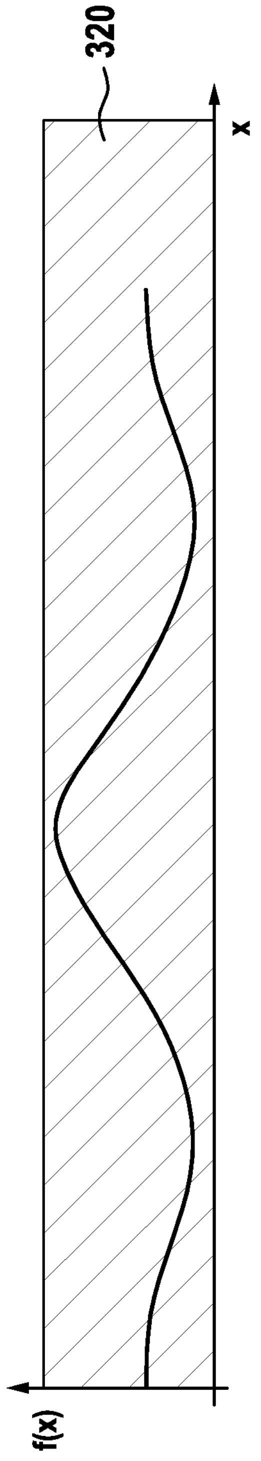

FIG. 12 shows the comparison of the state-typical model signal waveform 240, see FIGS. 12b and 12e, with the measured signal of the operating variable 200, see FIGS. 12a and 12d, in the event that the cross-correlation is used as the comparison method. In FIGS. 12a-f, the time or a variable correlating to time is plotted on the abscissa x. FIGS. 12a-c show the first region 310 corresponding to the screwing operation. FIGS. 12d-f show the third region 324 corresponding to the application class to be detected. As described further above, the measured signal of the operating variable, FIG. 12a and FIG. 12d, is correlated to the state-typical model signal waveform, FIGS. 12b and 12e. The respective results of the correlations are shown in FIGS. 12c and 12f. In FIG. 12c, the result of the correlation during the first region 310 is shown, wherein it is discernible that there is a low match of the two signals. In the example of FIG. 12c, it is therefore decided in method step S1.4 that the application class to be detected is not achieved. In FIG. 12f, the result of the correlation during the third region 324 is shown. It can be seen in FIG. 12f that there is a high match, so that in method step S1.4 it is decided that the application class to be detected exists.

Figure 13:
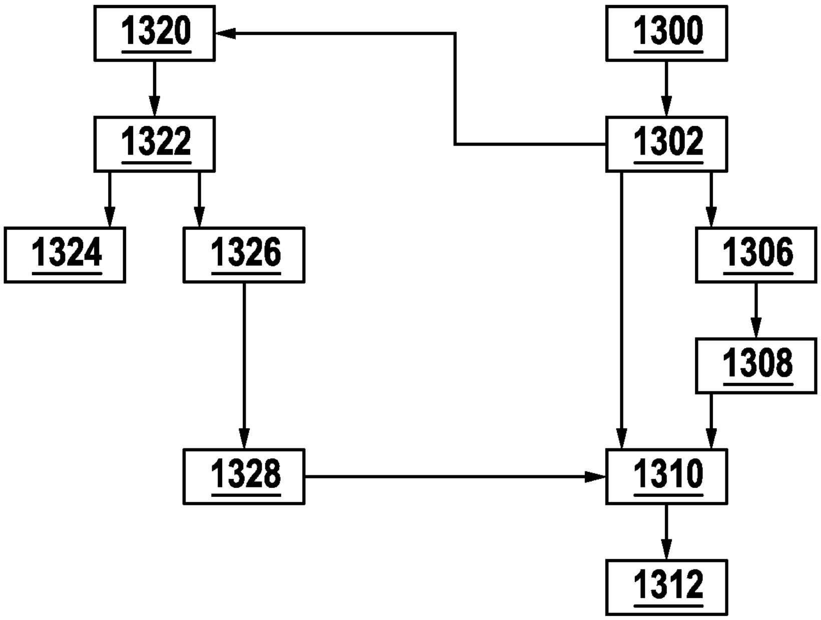

FIG. 13 shows an embodiment in which it is queried during a first connection to the app whether the second operation mode, which corresponds to the gentle mode, for example, should be selected in step D2 in principle and by default.

At 1300, a first connection of the hand-held power tool 100 to the app occurs. The user is then asked at 1302 via the app whether the second operation mode should be selected in step S2 as a matter of principle and by default.

If the user answers "yes" to this query, the model signal waveform 240 corresponding to the "hard screwdriving" application class is provided by default at 1310 in method step 1.2.

If the user answers "no" to the query made at 1302 at 1306, the model signal waveform 240 corresponding to the application class "hard screwdriving" is provided at 1310 in method step 1.2 and stored as the application class to be detected only if the user explicitly specifies this for a particular application at 1308.

If it is then recognized at 1312 using the above-described method steps S1.2 to S1.4 that the application class "hard screwdriving" is present, the second operating state is selected in step S2 and the screwdriving operation is carried out with reduced maximum torque.

With 1320, the following applications always inform the user that the second operation mode is active and can be deactivated via a corresponding menu if required.

If the second operation mode is deactivated by the user at 1322, a query is made as to whether the second operation mode is to be deactivated in principle at 1324 or only once at 1326.

If the user selects the one-time deactivation at 1322, at 1328, after the machine has been used once, the user basically returns to step S2 and selects the second operation mode by default.

The disclosure is not limited to the exemplary embodiment described and illustrated. Rather, it also comprises all further developments by an expert within the scope of the disclosure as defined by the disclosure.

In addition to the described and illustrated embodiments, further embodiments are conceivable, which can comprise further modifications as well as combinations of features.

What is claimed is:

1. A method of operating a hand-held power tool which includes an electric motor, comprising:

selecting an application class of a plurality of application classes based on at least one hardness property and/or strength property of a substrate in which a screwdriving operation is to be carried out; and selecting an operation mode from an operation mode group comprising a first operation mode and a second operation mode, based at least in part on the application class, wherein the first operation mode has a first maximum torque level delivered by the hand-held power tool per application class of the plurality of application classes and the second operation mode has a second maximum torque level delivered by the hand-held power tool per application class of the plurality of application classes, the second maximum torque level per application class different from the first maximum torque level delivered by the hand-held power tool per application class, wherein selecting the application class is at least partially automatic and comprises (i) ascertaining a signal of an operating variable of the electric motor, and (ii) selecting the application class based on the signal of the operating variable, and wherein the method further comprises (i) providing at least one model signal waveform, the at least one model signal waveform assignable to an application class of the plurality of application classes, (ii) comparing the signal of the operating variable to the at least one model signal waveform to ascertain a match score, and (iii) selecting the application class based on the match score.

2. The method according to claim 1, wherein the application class is selected from a group of application classes comprising a hard screwdriving application class and soft screwdriving application class.

3. The method according to claim 2, wherein, per application class, the first maximum torque level of the first operation mode is higher than the second maximum torque level of the second operation mode.

4. The method according to claim 3, wherein for each application class the second maximum torque level compared to the first maximum torque level is characterized by a lower rotational speed of the electric motor and/or a lower impact duration.

5. The method according to claim 3, wherein selecting the operation mode comprises:

selecting the first operation mode when the soft screwdriving application class is selected, and selecting the second operation mode when the hard screwdriving application class is selected.

6. The method according to claim 1, wherein:

selecting the application class is performed by a user, via an application software and/or a user interface on the hand-held power tool.

7. The method according to claim 1, wherein:

selecting the operation mode is performed by a user, via an application software and/or a user interface on the hand-held power tool.

8. The method according to claim 1, wherein:

selecting the operation mode is at least partially automatic.

9. The method according to claim 1, wherein:

the signal of the operating variable is compared with the at least one model signal waveform using a comparison method to determine whether at least a predetermined threshold value of the match score is satisfied.

10. The method of claim 1 wherein the hand-held power tool is a rotary impact wrench.

11. A method of operating a hand-held power tool which includes an electric motor, comprising:

selecting an application class of a plurality of application classes based on at least one hardness property and/or strength property of a substrate in which a screwdriving operation is to be carried out;

selecting an operation mode from an operation mode group comprising a first operation mode and a second operation mode, based at least in part on the application class; and performing a machine learning phase using at least two example applications to learn application classes of the plurality of application classes, wherein the first operation mode has a first maximum torque level delivered by the hand-held power tool per application class of the plurality of application classes and the second of operation mode has a second maximum torque level delivered by the hand-held power tool per application class of the plurality of application classes, the second maximum torque level per application class different from the first maximum torque level delivered by the hand-held power tool per application class, wherein selecting the application class is at least partially automatic and comprises (i) ascertaining a signal of an operating variable of the electric motor, and (ii) selecting the application class based on the signal of the operating variable, wherein the at least two example applications cover different application classes of the plurality of application classes, and wherein the application class is selected based on the application classes of the plurality of application classes learned in the machine learning phase.

12. The method according to claim 11, wherein performing the machine learning phase further comprises:

storing and classifying the signal of the operating variable associated with an example application of the at least two example applications into at least one or more application classes of the plurality of application classes; and generating model signal waveforms associated with the application classes of the plurality of application classes from the signal of the operating variable.

13. The method according to claim 11, wherein the at least two example applications are executed by a user of the hand-held power tool and/or read from a database.

14. The method according to claim 11, wherein the operating variable is a speed of the electric motor or an operating variable correlated to the speed.

15. The method according to claim 11, wherein:

ascertaining the signal of the operating variable comprises receiving the signal of the operating variable as a time course of measured values of the operating variable, or as measured values of the operating variable as a variable of the electric motor correlated with the time course.

16. The method according to claim 11, wherein ascertaining the signal of the operating variable comprises:

receiving the signal of the operating variable as a time course of measured values of the operating variable; and transforming the time course of the measured values of the operating variable into a course of the measured values of the operating variable as a variable of the electric motor correlated with the time course.

17. A hand-held power tool comprising:

an electric motor;

a measured value transducer of an operating variable of the electric motor; and a processor configured to:

operate the electric motor according to an application class of a plurality of application classes based on at least one hardness property and/or strength property of a substrate in which a screwdriving operation is to be carried out; and operate the electric motor according to an operation mode from an operation mode group comprising a first operation mode and a second operation mode, based at least in part on the application class, wherein the first operation mode has a first maximum torque level delivered by the hand-held power tool per application class of the plurality of application classes and the second of operation mode has a second maximum torque level delivered by the hand-held power tool per application class of the plurality of application classes, the second maximum torque level per application class different from the first maximum torque level delivered by the hand-held power tool per application class, wherein the processor automatically selects the application class by (i) ascertaining a signal of an operating variable of the electric motor, and (ii) selecting the application class based on the signal of the operating variable, and wherein the processor is further configured to (i) provide at least one model signal waveform, the at least one model signal waveform is assignable to an application class of the plurality of application classes, (ii) compare the signal of the operating variable to the at least one model signal waveform to ascertain a match score, and (iii) select the application class based on the match score.

* * * * *